(12) United States Patent
Shimoda et al.

(10) Patent No.: US 11,478,698 B2
(45) Date of Patent: Oct. 25, 2022

(54) PROGRAM, INFORMATION PROCESSING DEVICE, AND CONTROL METHOD

(71) Applicant: GREE, Inc., Tokyo (JP)

(72) Inventors: Shota Shimoda, Tokyo (JP); Yudai Nagano, Tokyo (JP); Hiori Chiba, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 16/864,289

(22) Filed: May 1, 2020

(65) Prior Publication Data

US 2020/0254338 A1 Aug. 13, 2020

Related U.S. Application Data

(63) Continuation of application No. 15/585,576, filed on May 3, 2017, now Pat. No. 10,682,570.

(30) Foreign Application Priority Data

May 12, 2016 (JP) ................................. 2016-095996

(51) Int. Cl.
  *A63F 13/48* (2014.01)
  *A63F 13/25* (2014.01)
  *A63F 13/50* (2014.01)

(52) U.S. Cl.
  CPC .............. *A63F 13/25* (2014.09); *A63F 13/48* (2014.09); *A63F 13/50* (2014.09); *A63F 2300/636* (2013.01)

(58) Field of Classification Search
  CPC .......... A63F 13/25; A63F 13/48; A63F 13/50; A63F 2300/636
  See application file for complete search history.

(56) References Cited

U.S. PATENT DOCUMENTS 5,083,271 A   1/1992   Thacher et al.
6,149,523 A   11/2000  Yamada et al.
(Continued)

FOREIGN PATENT DOCUMENTS

| JP | 2013-242798 A | 12/2013 |
| JP | 5833789 B1 | 12/2015 |
| JP | 5841280 A | 1/2017 |
| JP | 5909015 B1 | 1/2017 |
| WO | 03/097197 A1 | 11/2003 |

OTHER PUBLICATIONS

Office Action dated Jan. 15, 2019 in corresponding Japanese Application No. 2017-102755; 11 pages; Machine translation attached.
(Continued)

*Primary Examiner* — Steven J Hylinski
(74) *Attorney, Agent, or Firm* — Maier & Maier, PLLC

(57) ABSTRACT

A non-transitory computer-readable storage medium configured to operate a game program. The program may cause an information processing device to execute a step of storing information relating to a game part, a step of displaying a screen including a first interface capable of detecting a first user operation, a determination step of (if the first user operation is detected) determining a mode of the game part to be one of a first mode or a second mode, a change step of changing a part of the screen according to the mode of the game part determined in the determination step, and an execution step of executing the game part in the mode determined in the determination step.

20 Claims, 16 Drawing Sheets

(56) References Cited

U.S. PATENT DOCUMENTS

| | | | |
|---|---|---|---|
| 6,319,121 B1 | | 11/2001 | Yamada et al. |
| 6,347,993 B1 | | 2/2002 | Kondo et al. |
| 6,425,822 B1 | * | 7/2002 | Hayashida ............ A63F 13/005 |
| | | | 463/7 |
| 6,659,873 B1 | | 12/2003 | Kitano et al. |
| 6,764,401 B1 | | 7/2004 | Akatsuka |
| 7,008,322 B1 | | 3/2006 | Suzuki et al. |
| 8,029,348 B2 | * | 10/2011 | Suzuki .................. A63F 13/843 |
| | | | 463/7 |
| 2001/0005689 A1 | * | 6/2001 | Fujioka .................. A63F 13/69 |
| | | | 463/4 |
| 2002/0068629 A1 | | 6/2002 | Allen et al. |
| 2002/0188360 A1 | | 12/2002 | Muramori et al. |
| 2004/0014513 A1 | | 1/2004 | Boon |
| 2004/0087373 A1 | | 5/2004 | Choi |
| 2004/0242327 A1 | | 12/2004 | Shahar |
| 2005/0021159 A1 | | 1/2005 | Ogawa |
| 2005/0119050 A1 | | 6/2005 | Suzuki |
| 2005/0233804 A1 | | 10/2005 | Hata |
| 2005/0255914 A1 | * | 11/2005 | McHale .................. A63F 13/10 |
| | | | 463/31 |
| 2007/0265068 A1 | * | 11/2007 | Kane .................. G07F 17/3223 |
| | | | 463/29 |
| 2007/0298886 A1 | | 12/2007 | Aguilar, Jr. et al. |
| 2008/0311968 A1 | * | 12/2008 | Hunter .................. A63F 13/65 |
| | | | 463/1 |
| 2009/0149248 A1 | | 6/2009 | Busey et al. |
| 2010/0160038 A1 | | 6/2010 | Youm et al. |
| 2011/0306398 A1 | * | 12/2011 | Boch .................. A63F 13/5375 |
| | | | 463/7 |
| 2012/0064968 A1 | | 3/2012 | Youm et al. |
| 2013/0005417 A1 | * | 1/2013 | Schmidt .............. A63F 13/5378 |
| | | | 463/5 |
| 2014/0317566 A1 | | 10/2014 | Ohara et al. |

OTHER PUBLICATIONS

"Battle Neko Puzzle: Communication Battle with Squatting! Neko's battle screen is intense. free.", AppBank[online], <URL: http://www.appbank.net/2012/06/04/iphone-application/421105.php>, Jun. 4, 2012, 33 pages, Machine translation attached.

"This one is greatly reversed! The funny Othello game Reverse Rotational Ocelonia" as it is losing., AppBank[online], <http://www.appbank.net/2016/02/06/iphone-application/1161416.php>, Feb. 6, 2016, 30 pages, Machine translation attached.

Office Action dated Jun. 5, 2018 of corresponding Japanese application No. JP2017-102755; 15 pgs.

Weekly ASCII [online], "MONST: Ver.4.1 update quest so that the history of the formation that cleared is left", Published: Mar. 4, 2015, Searched: May 23, 2018, URL: <http://weekly.ascii.jp/elem/000/000/310/310703/>, 11 pgs.

Wiki [online], "Beginner must-see! Frequently Asked Questions and Answers in 'An Extinct City' (FAQ)", Published Sep. 28, 2015, Searched: May 23, 2018, 8 pgs.

Office Action corresponding application No. JP2016-095996 dated Aug. 2, 2016; 13 pgs.

Office Action corresponding application No. JP2016-095996 dated Dec. 13, 2016; 8 pgs.

[Monst] Monst Stadium "Practice Mode" tried!, URL: https://www.youtube.com/watch?v=v-aSbCKFsj8, Published: Jun. 8, 2015, 2 pgs.

[Monst Stadium] App for time attack appeared! It is!, URL: https://www.youtube.com/watch?v=RrEYw1xsn1s, Published: Apr. 26, 2015, 2 pgs.

Arad Senki Wiki, URL: http://dnf.wikiwiki.jp/?%A5%C0%A5%F3%A5%B8%A5%E7%A5%F3, Published: Feb. 9, 2016, 7 ogs.

Office Action dated Nov. 10, 2020 in corresponding Japanese Application No. 2019-186049; 9 pages Machine translation attached.

* cited by examiner

FIG.2

| USER ID | LOGIN INFORMATION | USER EXPERIENCE VALUE | USER RANK | STAMINA | INFORMATION RELATING TO GAME MEDIUM |
|---|---|---|---|---|---|
| user001 | *** | *** | *** | *** | *** |
| user002 | *** | *** | *** | *** | *** |
| user003 | *** | *** | *** | *** | *** |
| user004 | *** | *** | *** | *** | *** |
| ... | ... | ... | ... | ... | ... |

FIG.3

| FIRST GAME MEDIUM ID | STATE | COST | EXPERIENCE VALUE | LEVEL | HP | ATTACK POWER | RECOVERY POWER | SKILL |
|---|---|---|---|---|---|---|---|---|
| gc001 | LEADER | *** | *** | *** | *** | *** | *** | *** |
| gc002 | SUPPORT | *** | *** | *** | *** | *** | *** | *** |
| gc003 | SUPPORT | *** | *** | *** | *** | *** | *** | *** |
| gc004 | SUPPORT | *** | *** | *** | *** | *** | *** | *** |
| gc005 | SUPPORT | *** | *** | *** | *** | *** | *** | *** |
| gc006 | — | *** | *** | *** | *** | *** | *** | *** |
| ... | ... | ... | ... | ... | ... | ... | ... | ... |

FIG.4

| GAME PART ID | GAME PART SETTING ||||||
| | MODE | STAMINA CONSUMPTION | TIME LIMIT | REWARD INFORMATION | INFORMATION RELATING TO CONTINUATION OF PLAY ||
| | | | | | POSSIBILITY TO CONTINUE | RESOURCE |
| --- | --- | --- | --- | --- | --- | --- |
| gp001 | NORMAL MODE | 25 | 10 MINUTES | VIRTUAL CURRENCY × 5, 10% | POSSIBLE | VIRTUAL CURRENCY × 5 |
| | PRACTICE MODE | 0 | UNLIMITED | null | POSSIBLE | null |
| gp002 | NORMAL MODE | 40 | 10 MINUTES | VIRTUAL CURRENCY × 8, 80% | IMPOSSIBLE | - |
| | PRACTICE MODE | 0 | UNLIMITED | null | POSSIBLE | null |
| ... | ... | ... | ... | ... | ... | ... |

FIG.11

| USER ID | LOGIN INFORMATION | USER EXPERIENCE VALUE | USER RANK | STAMINA | INFORMATION RELATING TO GAME MEDIUM | LOCK FLAG |
|---|---|---|---|---|---|---|
| user001 | *** | *** | *** | *** | *** | 0 |
| user002 | *** | *** | *** | *** | *** | 0 |
| user003 | *** | *** | *** | *** | *** | 0 |
| user004 | *** | *** | *** | *** | *** | 1 |
| ⋮ | ⋮ | ⋮ | ⋮ | ⋮ | ⋮ | ⋮ |

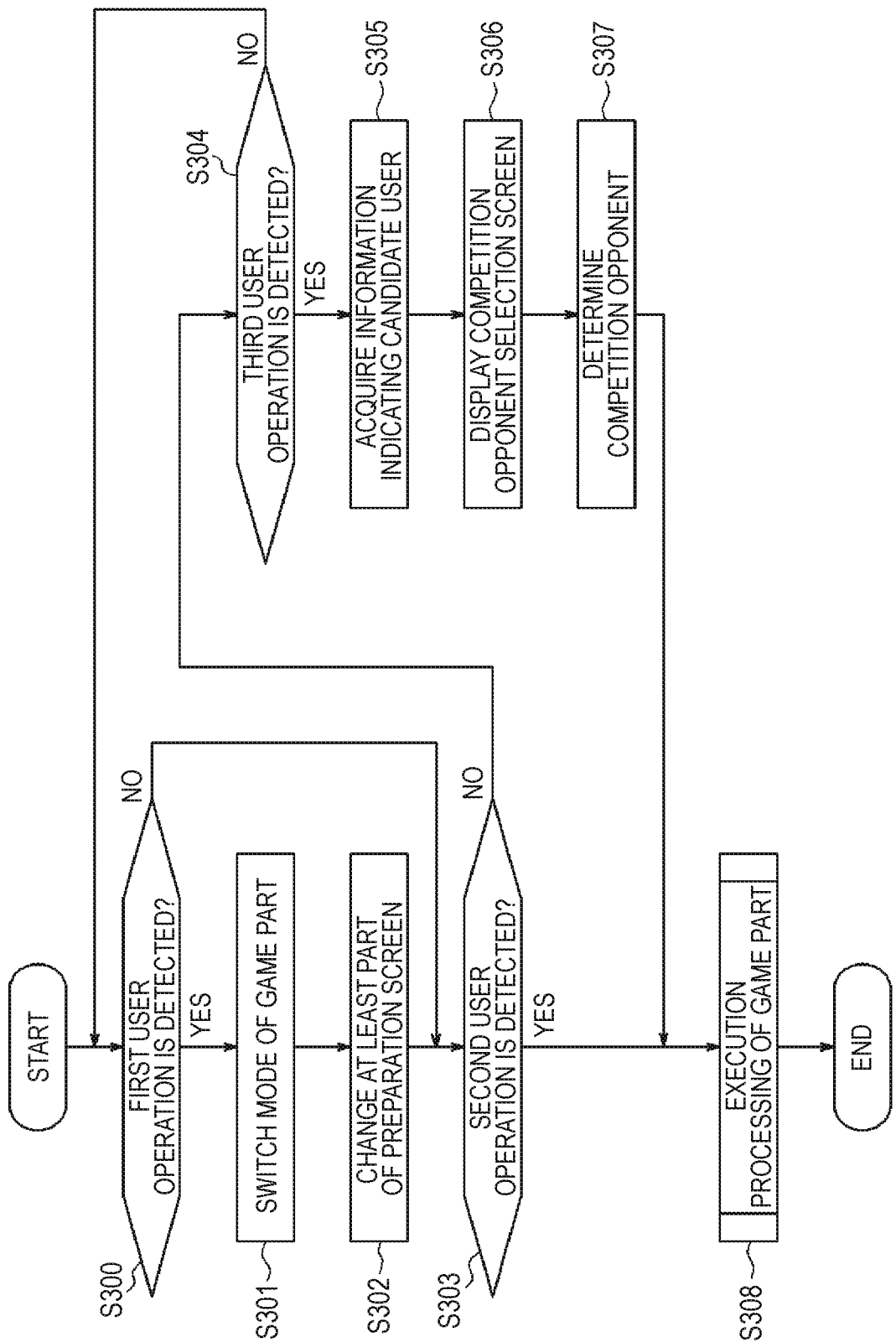

PROGRAM, INFORMATION PROCESSING DEVICE, AND CONTROL METHOD

CROSS-REFERENCE TO RELATED APPLICATIONS

This is a continuation application of a non-provisional application having U.S. patent application Ser. No. 15/585,576 entitled "PROGRAM, INFORMATION PROCESSING DEVICE, AND CONTROL METHOD" filed on May 3, 2017, which claims priority to Japanese Application No. 2016-095996 filed on May 12, 2016, the contents of which are all incorporated herein by reference.

BACKGROUND OF THE INVENTION

Field of the Invention

The present invention relates to a program, an information processing device, and a control method.

Background Art

Hitherto, a game which is executed by an information processing device is known. For example, Japanese Patent No. 5833789 discloses a configuration in which a user executes a game part, such as a quest or a mini game by consuming points owned by the user in a game.

SUMMARY OF THE INVENTION

In a game of the related art, convenience may not necessarily be high for a user. For example, there is a case where the user is unable to freely play a game part according to the setting of the game part, for example, a case where the points of the user are insufficient, or the like. Accordingly, there is room for improvement regarding the convenience of a game.

The invention has been accomplished in consideration of such a situation, and an object of the invention is to provide a program, an information processing device, and a control method capable of improving the convenience of a game.

According to an exemplary embodiment, there may be provided a program which causes an information processing device of a user to execute a step of storing information relating to a game part to be played by the user, a step of displaying a screen including a first interface capable of detecting a first user operation, a determination step of, if the first user operation is detected, determining a mode of the game part to a first mode or a second mode, a change step of changing a part of the screen according to the mode of the game part, and an execution step of executing the game part in the mode determined in the determination step.

According to another exemplary embodiment, there may be provided an information processing device including a storage unit which stores information relating to a game part to be played by a user, a display unit, and a control unit. The control unit may be configured to display a screen including a first interface capable of detecting a first user operation on the display unit, if the first user operation is detected, execute determination processing for determining a mode of the game part to a first mode or a second mode, change a part of the screen according to the mode of the game part, and execute the game part in the mode determined in the determination processing.

According to a further exemplary embodiment, there may be provided a control method of a game which may be executed by an information processing device of a user. The control method may include a step of storing information relating to a game part to be played by the user, a step of displaying a screen including a first interface capable of detecting a first user operation, a determination step of, if the first user operation is detected, determining a mode of the game part to a first mode or a second mode, a step of changing a part of the screen according to the mode of the game part, and an execution step of executing the game part in the mode determined in the determination step.

According to the program, the information processing device, and the control method of the invention, the convenience of a game may be improved.

BRIEF DESCRIPTION OF THE DRAWINGS

FIG. 2 is a diagram showing information relating to a user.
FIG. 3 is a diagram showing information relating to a first game content.
FIG. 4 is a diagram showing information relating to a game part.
FIG. 11 is a diagram showing information relating to a user according to a second embodiment of the invention.
FIG. 16 is a flowchart showing processing of the terminal device after the preparation screen according to the second embodiment is displayed.

DETAILED DESCRIPTION OF THE INVENTION

Hereinafter, embodiments of the invention will be described.

First Embodiment

Figure 1:
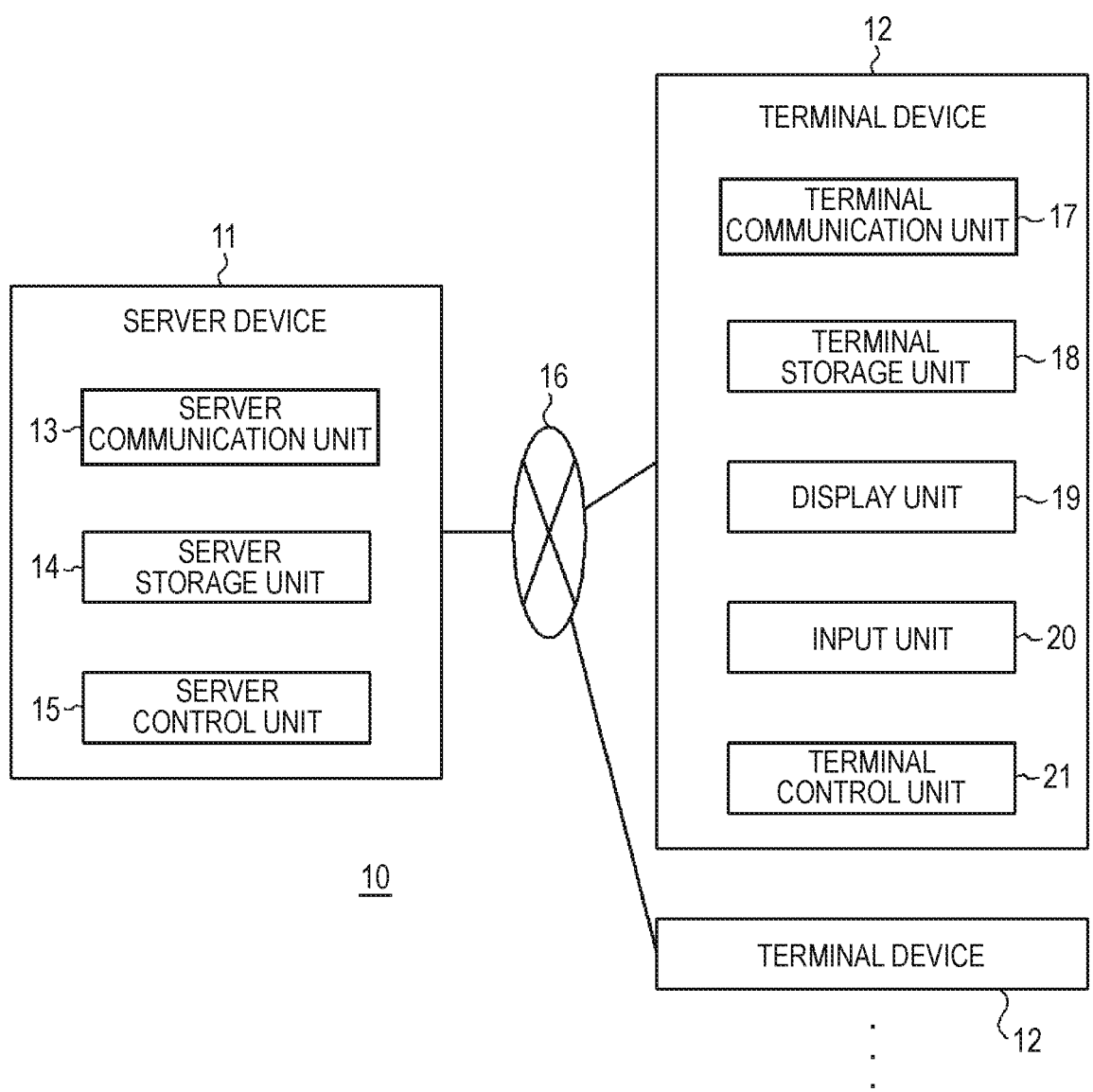
FIG. 1 is a block diagram of a game system according to a first embodiment of the invention.

First, a game system including a server device and a terminal device according to a first embodiment of the invention will be described. As shown in FIG. 1, a game system 10 according to this embodiment includes a server device 11 and one or more terminal devices 12. In FIG. 1, for simplification, although only two terminal devices 12 are shown, an arbitrary number of terminal devices 12 may be provided.

The server device 11 is an information processing device, such as, for example, a server which is managed by a game operator, and may provide a game (game data) to the terminal device 12 owned by the individual user. The terminal device 12 may be, for example, an information processing device, such as a mobile phone, a smartphone, a PC, or a game device, and executes the game provided from the server device 11. In this way, the server device 11 and the terminal device 12 may cooperate to control the game provided to the user of the terminal device 12.

The outline of the game according to this embodiment will be described. The game according to this embodiment may be a game in which the user can play a game part using a game content, for example.

The game content may be electronic data which is used in the game, and may include, for example, an arbitrary medium, such as a card, an item, a ticket, a character, an avatar, or a virtual currency. The game content may be electronic data which may be acquired, possessed, used, managed, exchanged, combined, augmented, sold, discarded, and/or gifted in the game by the user, though the forms of use of the game content are not limited to those explicitly included in the present disclosure.

Hereinafter, unless particularly specified, "the game content owned by the user" may indicate the game content associated with a user ID of the user. "Giving the game content to the user" indicates associating the game content with the user ID. "Discarding the game content owned by the user" indicates cancelling the association of the user ID and the game content. "Consuming the game content owned by the user" indicates cancelling the association of the user ID and the game content and causing any effect or influence to be generated in the game. "Selling the game content owned by the user" indicates cancelling the association of the user ID and the game content and associating a different game content (for example, a virtual currency, an item, or the like) with the user ID. "Assigning a game content owned by a user A to a user B" indicates cancelling the association of a user ID of the user A and the game content and associating the game content with a user ID of the user B.

The game part may be a content which is playable by the user in the game, and may include, for example, a quest, a mission, a mini game, an item acquisition event, a dungeon search event, a competition event with a competition opponent (for example, a different user, an enemy character, a building of an enemy, or the like), or the like. For example, in a case where it is determined that predetermined conditions (for example, a game task) set for each game part are successfully attained, a predetermined reward, for example, a game content, such as an item and a virtual currency, and points, such as an experience value, may be given to the user. For the game task, an arbitrary task according to the content of the game part, for example, a task for winning a competition with an enemy character, a task for attaining a goal of a dungeon, or the like is employable. In the following description, when a specific task (complete task) among the game tasks set for the game part is attained, this is referred to as game part complete. In other words, if it is determined that the complete task in the game part is successfully attained, it may be determined to be game part complete and the game part ends.

The game part according to this embodiment may be a game part for a single person in which the user plays alone. Specifically, as described below, the user which plays the game part performs a competition with, for example, an enemy character, such as a non-player character (NPC) using one or more first game contents (for example, a character) owned by the user and a second game content (for example, a character) owned by a different user.

The game part according to this embodiment may be, for example, a horizontal scroll type action game. The user may operate a moving character, such as a motorcycle, to acquire a predetermined item while avoiding obstacles and the like. The first game content and the second game content may attack an enemy character according to the number of acquired predetermined items. If the hit points (HP) of the enemy character are decreased to zero by an attack, the user wins the competition with the enemy character, and it is determined to be game part complete. If the total HP of the first game content and the second game content decreases to zero by an attack from the enemy character, the play of the game part may be brought into a state of being unable to be continued (for example, a state of game over). The game part is not limited to the above-described action game, and for example, a game of an arbitrary genre, such as a puzzle game, a quiz game, a fighting game, or a simulation game constructing a virtual space, such as a street or a garden, is constructed, may be performed.

In the game according to this embodiment, a plurality of modes, which may be, for example, two modes including a "normal mode" and a "practice mode" such as are described below, may be provided for one game part. The user can determine a mode of the game part to the "normal mode" or the "practice mode". Then, for example, game part settings, such as conditions required for executing the game part, may be switched according to the determined mode. With such a configuration, since the user can play one game part in a plurality of different settings, the convenience of the game is improved.

Next, each component of the game system 10 will be described.

Configuration of Server Device

First, the server device 11 will be described. The server device 11 may include a server communication unit 13, a server storage unit 14, and a server control unit 15.

The server communication unit 13 may be an interface which communicates with an external device in a wireless or wired manner and performs transmission and reception of information. In this embodiment, the server communication unit 13 can transmit and receive information with respect to the terminal device 12, for example, through a network 16, such as the Internet.

The server storage unit 14 may include, for example, a primary storage device and a secondary storage device, and may store various kinds of information and programs required for providing and controlling the game. For example, the server storage unit 14 may store information relating to the user and information relating to the game part.

Information Relating to User

Information relating to the user may include arbitrary information specific to the user. In this embodiment, for example, as shown in FIG. 2, information relating to the user includes login information, a user experience value, a user rank, stamina, and information relating to the game content in association with the user ID.

The user ID is information capable of uniquely identifying the user.

The login information indicates the date and time (hereinafter, referred to as the last login date and time) when the user logs in to the game system 10 last.

The user experience value may be a parameter which can increase according to the play of the game. For example, the user experience value may increase according to game part complete.

The user rank may be a parameter which increases according to the user experience value. For example, if the user experience value reaches a predetermined upper limit value, the user experience value may decrease to zero, and the user rank may be incremented. Accordingly, the user rank can indicate, for example, the degree of proficiency of the user at the game.

The stamina may be a parameter which is consumed when the game part is executed. As described below, a parameter "stamina consumption" is set in each game part, and the game part is executed on a requirement that the stamina is consumed (decreased) by the stamina consumption. In a case where the stamina does not satisfy the stamina consumption, a control may be performed so that the execution of the game part is disabled. The stamina may increase to a predetermined maximum value, for example, over time or according to the use of a predetermined game content. The maximum value of the stamina may be determined, for example, according to the user rank; for example, the higher the user rank, the larger the maximum value of the stamina.

Information relating to the game content may include arbitrary information relating to the game content owned by the user in the game. For example, information relating to the game content may include the number of virtual currencies owned by the user in the game. Information relating to the game content may include information relating to a first game content (for example, a character) usable in the play of the game part.

In this embodiment, information relating to the first game content may include, for example, a state, cost, an experience value, a level, HP, attack power, recovery power, and a skill in association with a first game content ID as shown in FIG. 3.

The first game content ID is information capable of uniquely identifying the first game content.

The state of the game content may be information capable of identifying the first game content included in a game content group (hereinafter, referred to as a deck) among first game contents owned by the user. The first game content included in the game content group may be used for the execution of the game part.

In this embodiment, the state can take the form of one of several potential states, such as "leader", "support, or "null". The state "leader" may indicate a first game content which is included in the game content group and in which a leader skill described below is validated. The state "support" may indicate a first game content which is included in the game content group and in which the leader skill described below is invalidated. The state "null" may indicate a first game content which is not included in the game content group. In the game content group, one first game content which is "leader" and a predetermined number (for example, four) of first game contents which are "support" may be permitted.

The cost may be a parameter used for determination regarding whether or not a first game content is capable of being added to the game content group. Specifically, the addition of a first game content may be permitted until the total value of the costs of the first game contents included in the game content group reaches a predetermined upper limit value. The value of the cost may be defined according to information (for example, level) relating to the first game content or may be a constant. The predetermined upper limit value may be defined according to information (for example, user rank) relating to the user or may be a constant.

Alternatively, the cost may be a parameter which is used for execution of a predetermined command to the first game content. The predetermined command may include, for example, an arbitrary command to the first game content, such as a command which causes the first game content to be provided (appear) on a game field, a command which causes the first game content to attack a competition opponent, or a command which causes the first game content to active a command skill described below. In a case where there are a plurality of commands corresponding to one first game content, the cost may be defined for each command. In a case where the value of the cost is equal to or less than a predetermined upper limit value, the command to the first game content may be executable. The predetermined upper limit value may be, for example, a predetermined points value associated with the user. The points decrease by the cost according to the execution of the command. The points may be increased (recovered), for example, over time, according to the use of a predetermined game content (for example, item), or according to activation of a predetermined command skill.

The experience value may be a parameter which can increase according to the play of the game. For example, the experience value may increase according to game part complete.

The level may be a parameter which increases according to the experience value. For example, if the experience value reaches a predetermined upper limit value, the experience value decreases to zero, and the level is incremented.

The hit points (HP) may be a parameter which is used for the execution of the game part. For example, if the total HP of the first game content included in the game content group decreases to zero during the execution of the game part, gameplay may be brought into a state of being unable to be continued. The total HP may decrease by the amount of damage by an enemy character, for example.

The attack power may be a parameter which is used for the execution of the game part. For example, the larger the attack power, the larger the amount of damage given to the enemy character by the first game content during the execution of the game part becomes.

The recovery power may be a parameter which is used for the execution of the game part. For example, the larger the total recovery power of the first game contents included in the game content group, the larger the amount of recovery (amount of increase) when a predetermined event (for example, acquisition of a recovery item) for recovering (increasing) the total HP is generated during the execution of the game part becomes.

The skill may be a function (ability) of a game content which generates a predetermined effect during the execution of the game part. For example, the skill may include a leader skill which is exhibited automatically and a command skill which is exhibited according to a user operation. The leader skill may generate an effect of increasing or decreasing the parameter (for example, total attack power or the like) of the game content group. The command skill may generate, for example, an effect of causing damage to the enemy character. The effects generated by the skills are not limited to those described above, and may include various effects.

Information Relating to Game Part

Arbitrary information specific to the game part is included. In this embodiment, information relating to the game part may include a mode and game part setting in association with a game part ID as shown in FIG. 4.

The game part ID may be information capable of uniquely identifying the game part.

The mode may be information indicating the mode of the game part. In this embodiment, there may be two modes of a "normal mode (first mode)" and a "practice mode (second mode)". At least one mode of the normal mode or the practice mode may be provided for one game part. In this embodiment, at least the normal mode maybe provided in the game part. For example, in FIG. 4, the normal mode and the practice mode are provided in a game part "gp001". Only the normal mode is provided in a game part "gp002". For example, there may be a game part for which only the practice mode is provided.

The game part setting may be provided for each mode and may include information indicating various settings relating to the game part. When the game part is executed, a game part setting corresponding to a mode determined as described below may be used. In this embodiment, the game part setting may include stamina consumption, a time limit, reward information, or information relating to the continuation of the play.

The stamina consumption may be a parameter which indicates the amount of stamina required for the execution of the game part. As described above, the game part may be executed based on a requirement that the stamina of the user is consumed (subtracted) by the stamina consumption. The value of the stamina consumption may be different according to the mode of the game part. Preferably, the stamina consumption corresponding to the practice mode may be smaller than the stamina consumption corresponding to the normal mode, and may be defined as, for example, zero. With such a configuration, since a requirement for executing the game part in the practice mode is relaxed compared to the normal mode, the convenience of the game is improved.

In this embodiment, in the game part setting corresponding to the normal mode, the stamina consumption is defined to a value greater than zero. In the game part setting corresponding to the practice mode, the stamina consumption is defined to zero. For example, in FIG. 4, the stamina consumption corresponding to the normal mode of the game part "gp001" is 25 points, and the stamina consumption corresponding to the practice mode is 0 points.

The time limit may be used for comparison with an elapsed time from the start of the game part during the play of the game part. For example, if the elapsed time reaches the time limit before the game part is completed, the play of the game part may be brought into a state of being unable to be continued (for example, a state of game over). In such a case, if CONTINUE described below is executed, for example, the elapsed time may be reset and the game part can be continuously played. The time limit may be different according to the mode of the game part. Preferably, the time limit corresponding to the practice mode may be longer than the time limit corresponding to the normal mode, and may be defined as, for example, unlimited. In such a configuration, since a possibility that the play of the game part in the practice mode is brought into a state of being unable to be continued is reduced compared to the normal mode, the convenience of the game is improved.

In this embodiment, in the game part setting corresponding to the normal mode, the time limit may be defined as unlimited or to a predetermined value. In the game part setting corresponding to the practice mode, the time limit may be defined as unlimited. For example, in FIG. 4, the time limit corresponding to the normal mode of the game part "gp001" is 10 minutes, and the time limit corresponding to the practice mode is unlimited.

The reward information may include arbitrary information relating to a reward to be given to the user in a case where predetermined conditions are attained in the game part. The predetermined conditions may include, for example, a condition that a game task set for the game part is attained, but may include an arbitrary condition relating to the game part. In this embodiment, the reward information may include, for example, the type of reward, a quantity, and information indicating a probability that a reward is given in a case where the predetermined conditions are attained. The type of reward may include, for example, a game content, such as a character or a virtual currency, and points for increasing a parameter, such as the user experience value or the experience value of the first game content. The reward may be given by changing (updating) corresponding information or a parameter in information relating to the user.

The reward information may be different according to the mode of the game part. Preferably, the quantity of the reward or the probability corresponding to the practice mode may be smaller than the quantity of the reward or the probability corresponding to the normal mode, and may be defined to be, for example, zero. With such a configuration, for example, as described above, in a case where the requirement for executing the game part in the practice mode is relaxed compared to the normal mode, since the quantity of the reward or the probability decreases in the practice mode, the game balance may be appropriately adjusted. In a case where the quantity of the reward or the probability corresponding to the practice mode is defined to be zero, it is not necessary to update information relating to the user according to the execution of the game part in the practice mode. For this reason, for example, the game part in the practice mode may be executable on the terminal device 12 alone without performing communication between the server device 11 and the terminal device 12, and it is possible to suppress a communication frequency and a communication amount.

In this embodiment, in the game part setting corresponding to the normal mode, the reward information may be defined such that any reward may be given. In the game part setting corresponding to the practice mode, the reward information may be defined such that no reward is given. For example, in FIG. 4, the reward information corresponding to the normal mode of the game part "gp001" is "virtual currency.times.5, 10%", and this indicates that five virtual currencies are given with the probability of 10%. The reward information corresponding to the practice mode is "null", and this indicates that no reward is given.

Information relating to the continuation of the play may include arbitrary information which is used for processing (for example, processing for performing CONTINUE) for continuing the play to be executed in a case where the play of the game part is brought into a state of being unable to be continued (for example, a state of game over) during the play of the game part. For example, when a condition that the total HP of the game content group decreases to zero during the play of the game part, or the like is attained and the game is over, in a case where CONTINUE is executed, the total HP increases to, for example, the maximum value, and the play of the game part can be continued. When the game is over during the play of the game part, in a case where CONTINUE is not executed, game over is determined and the game part ends.

In this embodiment, although information relating to the continuation of the play includes information indicating the possibility of CONTINUE in a case where the game is over, and information indicating a resource (for example, a game content, a virtual currency, or the like associated with the user) of the user consumed for performing CONTINUE, information relating to the continuation of the play may not be limited thereto. For example, information relating to the continuation of the play may further include information indicating the limited number of times that CONTINUE can be executed.

Information relating to the continuation of the play may be different according to the mode of the game part. Preferably, information relating to the continuation of the play corresponding to the practice mode is defined such that CONTINUE is possible at the large number of times with a small number of resources (for example, with no resources) compared to the normal mode. With such a configuration, since CONTINUE can be easily executed in the practice mode compared to the normal mode, the convenience of the game is improved.

In this embodiment, in the game part setting corresponding to the normal mode, information relating to the continuation of the play may be defined such that CONTINUE is impossible, or may be defined such that CONTINUE is possible by consuming some resources. In the game part setting corresponding to the practice mode, information relating to the continuation of the play may be defined such that CONTINUE is possible without consuming any resources. For example, in FIG. 4, information relating to the continuation of the play corresponding to the normal mode of the game part "gp001" indicates that CONTINUE is possible by consuming five virtual currencies. Information relating to the continuation of the play corresponding to the practice mode of the game part "gp001" indicates that CONTINUE is possible without consuming any resources. Information relating to the continuation of the play corresponding to the normal mode of the game part "gp002" indicates that CONTINUE is impossible.

Information relating to the game part is not limited to that described above. For example, information relating to the game part may further include arbitrary information required for the execution of the game part, such as image data which is displayed on the terminal device 12 during the execution of the game part and information relating to the enemy character.

The server control unit 15 (see FIG. 1) may include a dedicated or general-purpose processor. The server control unit 15 controls the operation of the entire server device 11. For example, the server control unit 15 performs transmission and reception of information through the server communication unit 13. The server control unit 15 may store information relating to the game part described above, information relating to a specific game content, and setting information of the game part in the server storage unit 14.

The server control unit 15 may perform various kinds of processing relating to the game part. Hereinafter, specific description will be provided.

The server control unit 15 may transmit information (see FIGS. 2 and 3) relating to at least a part of a plurality of users to the terminal device 12. The server control unit 15 may transmit, to the terminal device 12, information relating to other users who satisfy a condition (specifically, a condition of being potentially selectable as a supporter, or a "selection possibility condition") that an elapsed time from the last login date and time indicated in the login information to the current time is less than a predetermined value among a plurality of users other than the user of the terminal device 12. Information relating to other users transmitted to the terminal device 12 is used for display processing of a screen for selecting a supporter, execution processing of a game part, or the like in the terminal device 12, for example. The processing in the terminal device 12 will be described below. In this embodiment, although transmission of information relating to the user is performed, for example, when the user of the terminal device 12 logs in to the game system 10, transmission of information relating to the user may be performed at an arbitrary timing.

The server control unit 15 may transmit information (see FIG. 4) relating to one or more game parts to the terminal device 12. Information relating to the game part transmitted to the terminal device 12 is used for execution processing of the game part in the terminal device 12, for example. The processing in the terminal device 12 will be described. In this embodiment, although transmission of information relating to the game part is performed, for example, when the user first plays the game part, transmission of information relating to the game part may be performed at an arbitrary timing. Information relating to the game part transmitted to the terminal device 12 is stored in the terminal device 12 as described below. For this reason, when the user plays the game part again, the server control unit 15 may omit transmission of information relating to the game part.

Configuration of Terminal Device

Next, the terminal device 12 will be described. As shown in FIG. 1, the terminal device 12 may include a terminal communication unit 17, a terminal storage unit 18, a display unit 19, an input unit 20, and a terminal control unit 21.

The terminal communication unit 17 may be an interface which communicates with an external device in a wireless or wired manner and performs transmission and reception of information. In this embodiment, the terminal communication unit 17 may perform transmission and reception of information with respect to the server device 11 through the network 16.

The terminal storage unit 18 may include, for example, a primary storage device and a secondary storage device, and stores various kinds of information and programs required for processing of the game provided from the server device 11. For example, the terminal storage unit 18 may store a dedicated application (hereinafter, referred to as a game application) for executing the game. The game application may be acquired from a predetermined application distribution server through the network 16, for example. In a state where the game application is executed (started), the operation of the terminal device 12 relating to the game is implemented.

The terminal storage unit 18 may store information relating to the user and information relating to the game part received from the server device 11.

The terminal storage unit 18 may store a mode determined as described below among a plurality of modes set for the game part. Specifically, the terminal storage unit 18 may store the normal mode or the practice mode as the determined mode. As described below, the game part may be executed using the game part setting corresponding to the determined mode with priority. In this embodiment, although the modes stored in the terminal storage unit 18 are used in common to all game parts, the modes may be stored for each game part.

The display unit 19 is, for example, a display device, such as a liquid crystal display or an organic EL display, and can display various screens.

The input unit 20 is, for example, an input interface including a touch panel provided integrally with the display unit 19, and can receive a user operation on the terminal device 12.

The terminal control unit 21 may include a dedicated or general-purpose processor. The terminal control unit 21 may control the operation of the entire terminal device 12. For example, the terminal control unit 21 may perform transmission and reception of information through the terminal communication unit 17. The terminal control unit 21 executes (starts) the game application according to a user operation.

The terminal control unit 21 may perform various processing relating to the game part. Hereinafter, specific description will be provided.

The terminal control unit 21 may acquire information relating to one or more users from the server device 11 and may store information in the terminal storage unit 18. Specifically, the terminal control unit 21 may store information relating to one or more users including the user of the terminal device 12 among a plurality of users. The terminal control unit 21 may acquire information relating to one or more game parts from the server device 11 and may store information in the terminal storage unit 18.

The terminal control unit 21 may determine a game content group including one or more first game contents automatically or according to a user operation. Specifically, the terminal control unit 21 may define the states of one or more first game contents selected automatically or according to a user operation among first game contents owned by the user to "leader" or "support" to update information relating to the user stored in the terminal storage unit 18. The terminal control unit 21 may transmit information relating to the user after update to the server device 11. In this way, information relating to the user after update is stored in the server device 11 and the terminal device 12, respectively.

The terminal control unit 21 may display a screen for selecting a game part on the display unit 19 according to a predetermined user operation, for example. The screen for selecting a game part may be a screen on which a graphic user interface capable of detecting a user operation for selecting one game part among one or more game parts is displayed. Hereinafter, the graphic user interface is simply referred to as an interface. The screen for selecting a game part may be displayed using information relating to one or more game parts stored in the terminal storage unit 18. The terminal control unit 21 may select one game part among one or more game parts according to a user operation on the screen for selecting a game part.

Figure 5:
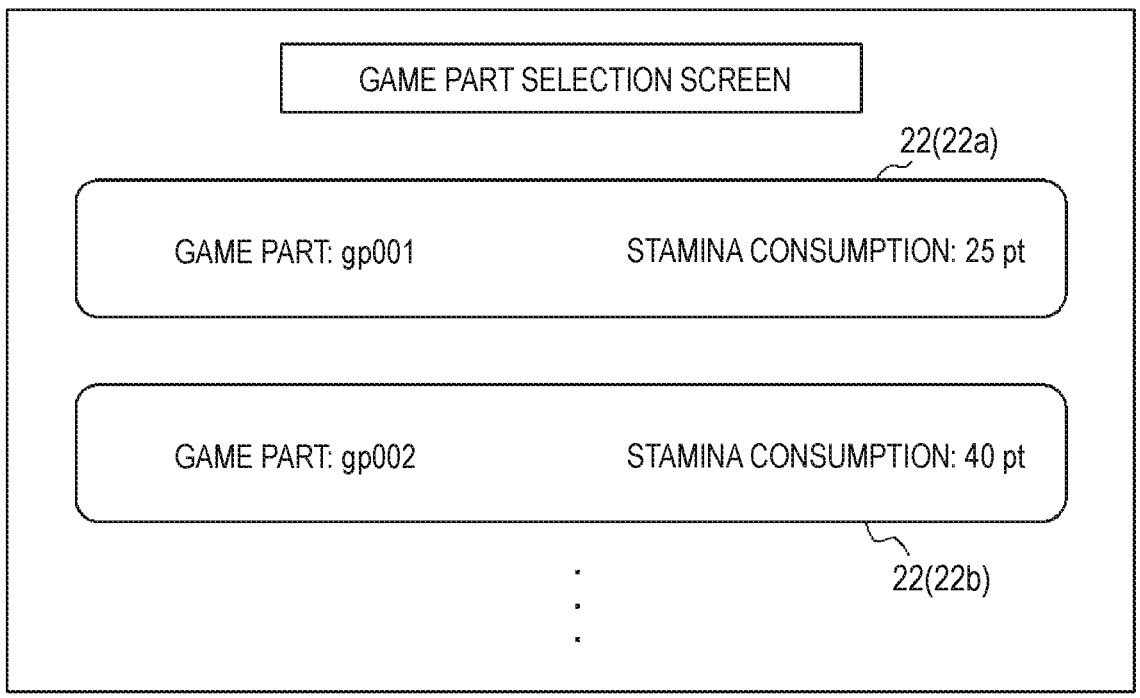
FIG. 5 is a diagram showing a screen for selecting a game part.

For example, on the screen for selecting a game part shown in FIG. 5, two interfaces 22 (22a and 22b) capable of detecting user operations to respectively select the game parts "gp001" and "gp002" may be displayed. Preferably, on the screen for selecting a game part, information relating to each game part, for example, the stamina consumption may be displayed. The terminal control unit 21 may select the game part "gp001" if the user operation to the interface 22a corresponding to the game part "gp001" is detected, for example.

Subsequently, the terminal control unit 21 may display a screen for selecting a supporter on the display unit 19. The screen for selecting a supporter may be a screen on which an interface capable of detecting a user operation for selecting one second game content among one or more second game contents satisfying the selection possibility condition is displayed. Although the second game content is a first game content with the state defined to "leader" among first game contents owned by users other than the user of the terminal device 12, the second game content may be an arbitrary first game content owned by a different user. The second game content satisfying the selection possibility condition is a second game content of a different user who satisfies the condition that the elapsed time from the last login date and time to the current time is less than the predetermined value as described above. The screen for selecting a supporter may be displayed using information relating to other users stored in the terminal storage unit 18. The terminal control unit 21 may select one second game content among one or more second game contents according to a user operation on the screen for selecting a supporter. The selected second game content may be used for the execution of the game part along with the first game content included in the game content group.

Figure 6:
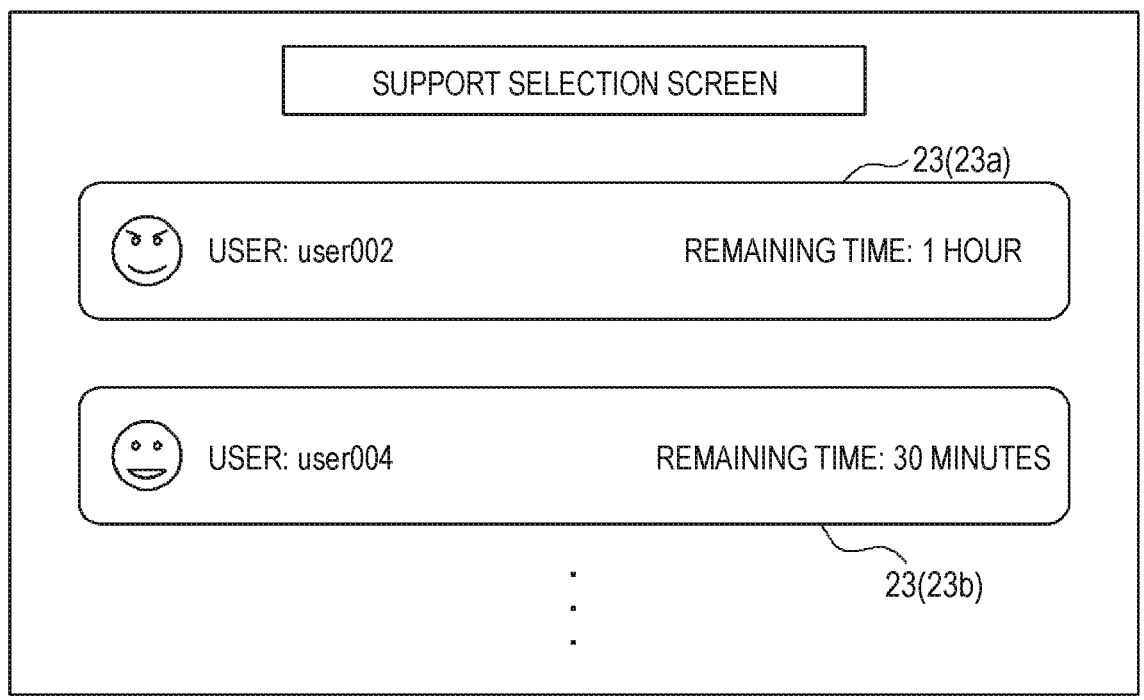
FIG. 6 is a diagram showing a screen for selecting a supporter.

For example, on a screen for selecting a supporter shown in FIG. 6, two interfaces 23 (23a and 23b) capable of detecting user operations to respectively select a second game content of a user "user002" and a second game content of a user "user004" may be displayed. Preferably, on the screen for selecting a supporter, an image of each second game content and a remaining time until the selection possibility condition is not satisfied may be displayed. The terminal control unit 21 may select the second game content of the user "user002" if the user operation to the interface 23a corresponding to the second game content of the user "user002" is detected, for example.

Subsequently, the terminal control unit 21 may display a preparation screen on the display unit 19. The preparation screen is a screen on which an interface (first interface) capable of detecting a user operation (first user operation) for determining the mode of the game part is displayed. The terminal control unit 21 may determine the mode of the game part to the normal mode or the practice mode according to the first user operation to the first interface. Specifically, the terminal control unit 21 may switch the mode of the game part between the normal mode and the practice mode each time the first user operation is detected.

The terminal control unit 21 may change at least a part of the preparation screen according to the mode of the game part. With such a configuration, since the user may easily recognize the mode of the game part, the convenience of the game is improved. Hereinafter, specific description will be provided.

On the preparation screen according to the embodiment, in addition to the above-described first interface, an interface (second interface) capable of detecting a user operation (second user operation) for executing (starting) the game part in the determined mode and information relating to the mode of the game part may be further displayed. The terminal control unit 21 may change the display form of at least one of the first interface or the second interface, for example, a shape, color, an image, text, or the like according to the mode of the game part, for example. The terminal control unit 21 may change information (for example, an explanation of the mode) relating to the mode of the game part displayed on the preparation screen.

Figure 7:
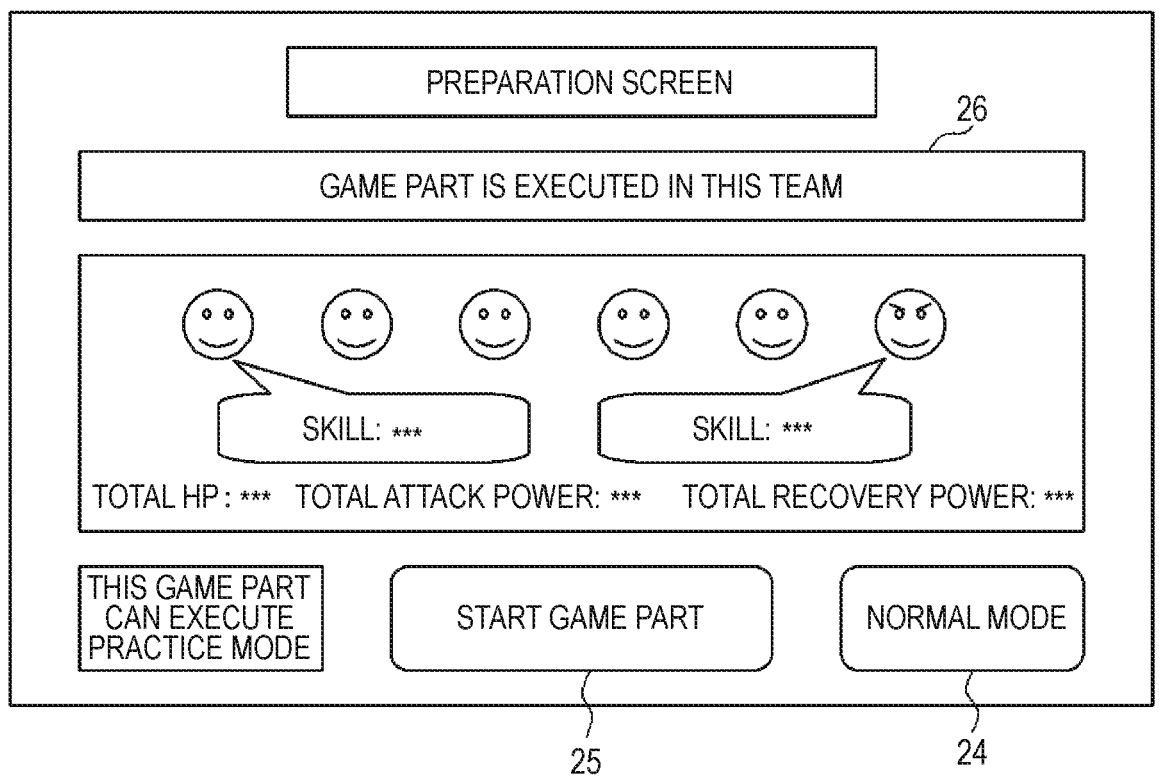
FIG. 7 is a diagram showing a preparation screen in a normal mode.

For example, FIG. 7 may show an example of a preparation screen in a case where the mode of the game part is the normal mode. On the preparation screen shown in FIG. 7, text, such as "NORMAL MODE," indicating the mode of the game part may be displayed in a first interface 24. In a second interface 25, text "START GAME PART" may be displayed. The shape of the second interface 25 may be substantially a quadrangular shape. In an area 26, text "GAME PART IS EXECUTED IN THIS TEAM" may be displayed as information relating to the normal mode.

In a case where the mode of the game part is the normal mode, if the first user operation to the first interface 24 is detected, the terminal control unit 21 may determine the mode of the game part from the normal mode to the practice mode. If the second user operation to the second interface 25 is detected, the terminal control unit 21 may perform the execution processing of the game part in the normal mode. Specifically, the terminal control unit 21 may read the game part setting corresponding to the normal mode of the game part from information relating to the game part stored in the terminal storage unit 18 and may execute the game part based on the game part setting.

In this embodiment, in the game part setting corresponding to the normal mode, as described above, the stamina consumption may be defined to a value greater than zero, and the reward information may be defined such that any reward can be given. Accordingly, information relating to the user may be updated. For this reason, the terminal control unit 21 updates, for example, information relating to the stamina and the game content in information relating to the user in a case where the game part is executed in the normal mode. The terminal control unit 21 may transmit information relating to the user after update to the server device 11. In other words, in a case where the mode of the game part is the normal mode, the terminal control unit 21 may update information relating to the user stored in the terminal storage unit 18 and may communicate with the server device 11 to update information relating to the user stored in the server device 11. The terminal control unit 21 may communicate with the server device 11 to update information relating to the user, for example, at the time of the start and the end of the game part. In such a case, for example, the stamina for the stamina consumption decreases at the time of the start of the game part. At the end of the game part, for example, a reward for the user is given.

Figure 8:
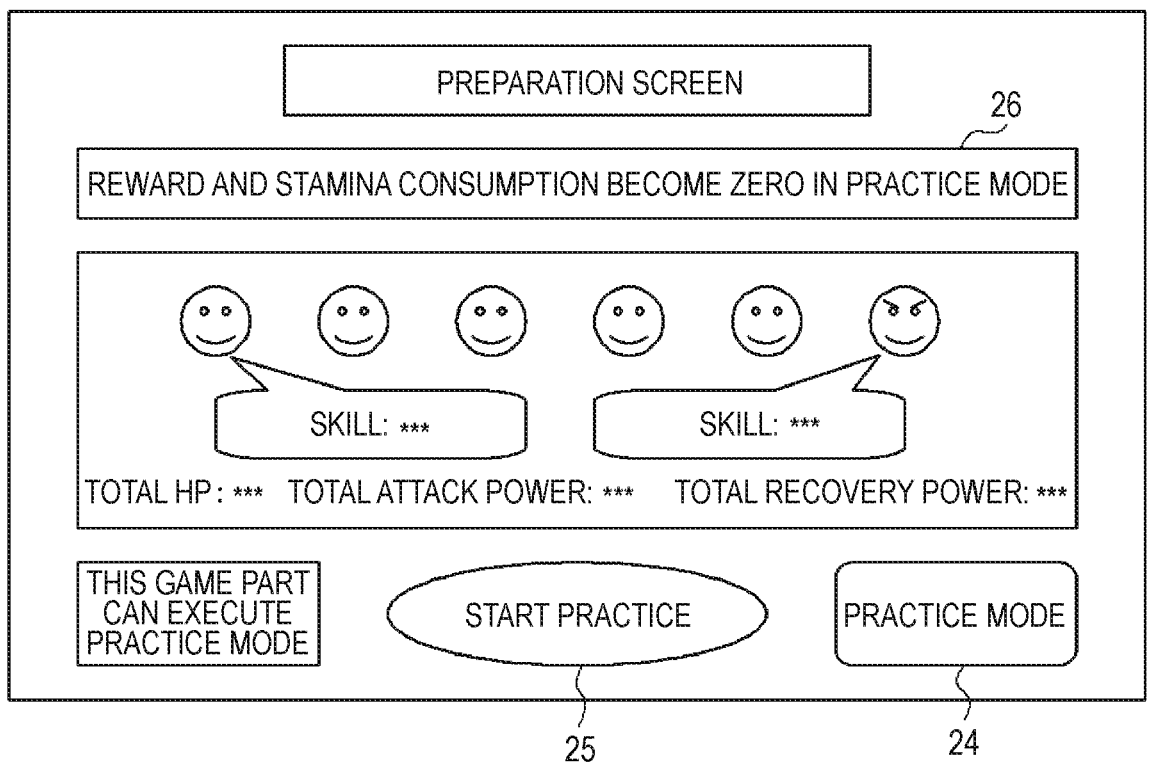
FIG. 8 is a diagram showing a preparation screen in a practice mode.

For example, FIG. 8 shows an example of a preparation screen in a case where the mode of the game part is the practice mode. On the preparation screen shown in FIG. 8, text displayed in the first interface 24 may be changed to text, such as "PRACTICE MODE," indicating the mode of the game part. The text displayed in the second interface 25 may be changed to text such as "START PRACTICE". The shape of the second interface 25 may be changed to an elliptical shape. Text displayed in the area 26 may be changed to text such as "REWARD AND STAMINA CONSUMPTION BECOME ZERO IN PRACTICE MODE" as information relating to the practice mode.

In a case where the mode of the game part is the practice mode, if the first user operation to the first interface 24 is detected, the terminal control unit 21 may determine the mode of the game part from the practice mode to the normal mode. If the second user operation to the second interface 25 is detected, the terminal control unit 21 may perform the execution processing of the game part in the practice mode. Specifically, the terminal control unit 21 may read the game part setting corresponding to the practice mode of the game part from information relating to the game part stored in the terminal storage unit 18 and may execute the game part based on the game part setting.

In this embodiment, in the game part setting corresponding to the practice mode, as described above, the stamina consumption may be defined to zero, and the reward information may be defined such that no reward is given. Accordingly, unlike a case where the game part is executed in the normal mode, information relating to the user does not need to be updated. Therefore, in a case where the mode of the game part is the practice mode, the terminal control unit 21 may not update information relating to the user stored in the terminal storage unit 18 and may not perform communication for updating information relating to the user with the server device 11. For this reason, information relating to the user stored in the server device 11 may not be updated.

In a case where the mode of the game part is the normal mode, if the play of the game part is brought into a state of being unable to be continued during the execution of the game part, the terminal control unit 21 may end the game part automatically, or may continue the play of the game part according to a predetermined user operation in a case where the mode of the game part is the normal mode. Specifically, in an exemplary embodiment, the terminal control unit 21 may end the game part automatically in a case where the game part is defined such that CONTINUE is impossible, and may execute CONTINUE according to a predetermined user operation and continue the play of the game part in the case where the game part is defined such that CONTINUE is possible.

In this embodiment, in the game part setting corresponding to the normal mode, as described above, information relating to the continuation of the play is defined such that CONTINUE is impossible or is defined such that CONTINUE is possible by consuming some resources. Accordingly, in a case where CONTINUE is executed by consuming resources in the normal mode, information relating to the user needs to be updated. For this reason, in a case where CONTINUE is executed in the normal mode, the terminal control unit 21 updates information relating to the user such that the resources are consumed. The terminal control unit 21 transmits information relating to the user after update to the server device 11. In other words, in a case where the mode of the game part is the normal mode, if CONTINUE is executed, the terminal control unit 21 updates the information relating to the user stored in the terminal storage unit 18 and communicates with the server device 11 to update information relating to the user stored in the server device 11.

In a case where the mode of the game part is the practice mode, if the play of the game part is brought into a state of being unable to be continued during the execution of the game part, the terminal control unit 21 executes CONTINUE automatically and continues the play of the game part. With such a configuration, since a user who plays the game part in the practice mode does not need to perform a user operation for executing CONTINUE, usability of the game is improved.

In this embodiment, in the game part setting corresponding to the practice mode, as described above, information relating to the continuation of the play is defined such that CONTINUE is possible without consuming any resources. Accordingly, unlike a case where CONTINUE is executed in the normal mode, information relating to the user does not need to be updated. Therefore, in a case where CONTINUE is executed in the practice mode, the terminal control unit 21 does not update information relating to the user stored in the terminal storage unit 18 and does not perform communication with the server device 11. For this reason, information relating to the user stored in the server device 11 is not updated.

Figure 9:
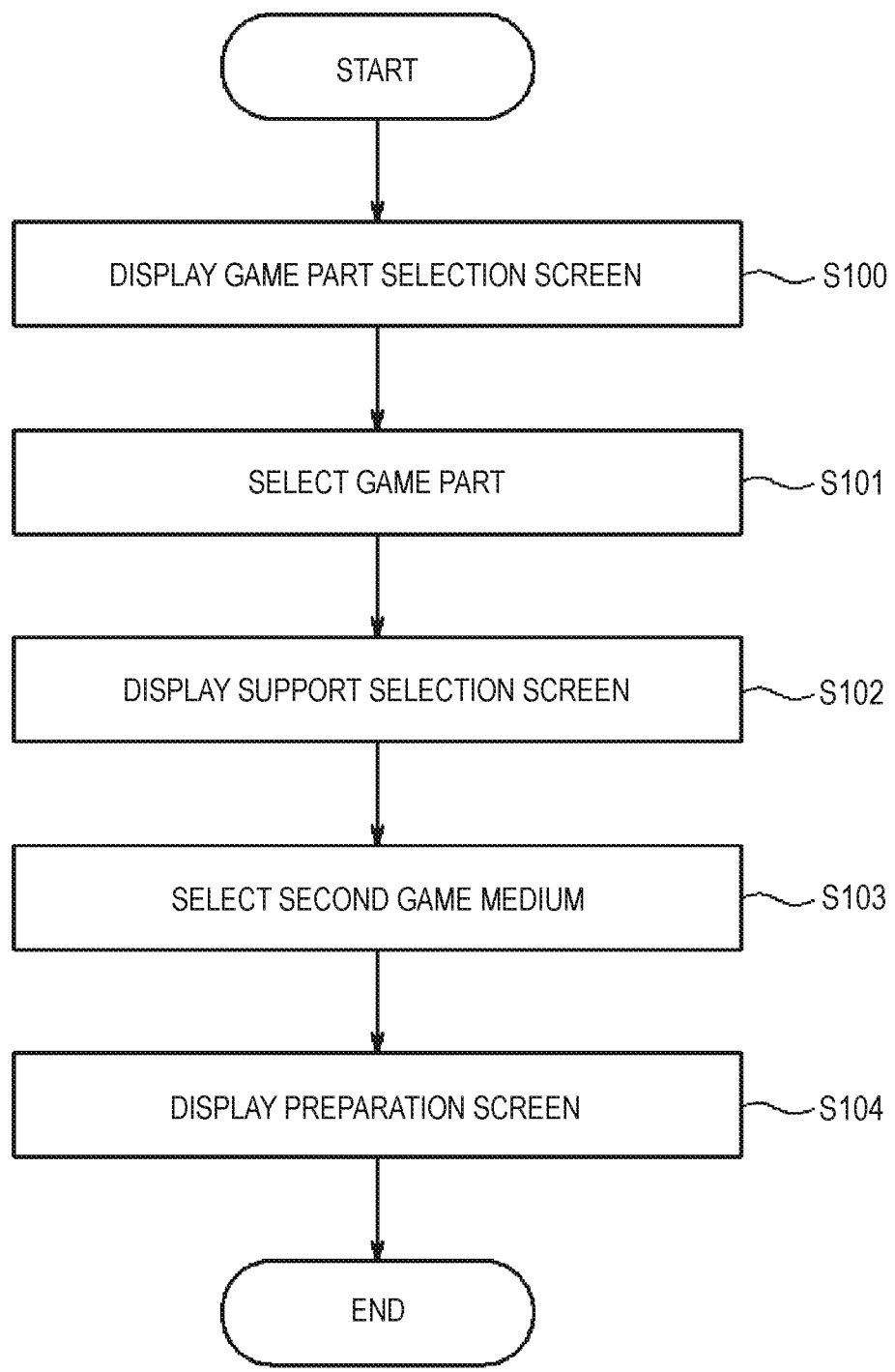
FIG. 9 is a flowchart showing processing of a terminal device until the preparation screen is displayed.

Next, in the processing relating to the game part which is executed by the terminal device 12, which may be processing performed before the preparation screen may be displayed and after the screen for selecting a game part is displayed, may be described referring to the flowchart of FIG. 9. It is assumed that information relating to the user and information relating to the game part are stored in the terminal device 12.

Step S100: First, the terminal control unit 21 displays the screen for selecting a game part on the display unit 19 according to a predetermined user operation, for example.

Step S101: Subsequently, the terminal control unit 21 selects one game part among one or more game parts according to a user operation on the screen for selecting a game part. Hereinafter, the selected one game part is simply referred to as a game part.

Step S102: Subsequently, the terminal control unit 21 displays the screen for selecting a supporter on the display unit 19.

Step S103: Subsequently, the terminal control unit 21 selects one second game content among one or more second game contents according to a user operation on the screen for selecting a supporter.

Step S104: Then, the terminal control unit 21 displays the preparation screen on the display unit 19.

Figure 10:
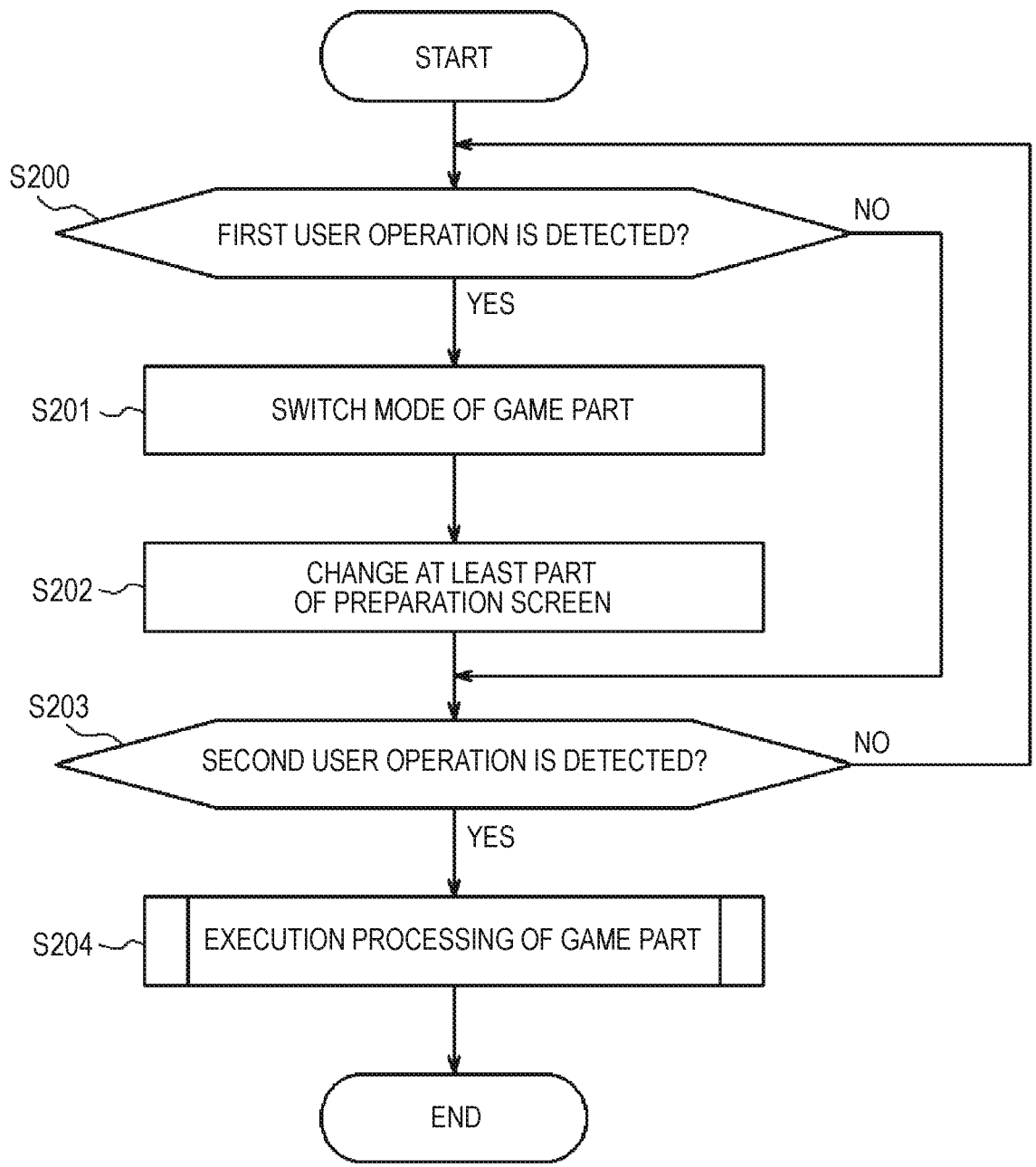
FIG. 10 is a flowchart showing processing of the terminal device after the preparation screen is displayed.

Subsequently, in the processing relating to the game part which is executed by the terminal device 12, processing that may take place before the game part is executed, beginning from a state where the preparation screen is displayed, may be described, referring to the flowchart of FIG. 10. This processing may be executed after Step S104 described above.

Step S200: First, the terminal control unit 21 determines whether or not the first user operation to the first interface on the preparation screen is detected. In a case where it is determined that the first user operation is detected (Step S200—Yes), the process progresses to Step S201. In a case where it is determined that the first user operation is not detected (Step S200—No), the process progresses to Step S203.

Step S201: In a case where it is determined in Step S200 that the first user operation is detected (Step S200—Yes), the terminal control unit 21 determines the mode of the game part to the normal mode or the practice mode. Specifically, the terminal control unit 21 switches the mode of the game part between the normal mode and the practice mode.

Step S202: Subsequently, the terminal control unit 21 changes at least a part of the preparation screen according to the mode determined in Step S201.

Step S203: After Step S202 or in a case where it is determined in Step S200 that the first user operation is not detected (Step S200—No), the terminal control unit 21 determines whether or not the second user operation to the second interface on the preparation screen is detected. In a case where it is determined that the second user operation is detected (Step S203—Yes), the process progresses to Step S204. In a case where it is determined that the second user operation is not detected (Step S203—No), the process returns to Step S200.

Step S204: In a case where it is determined in Step S203 that the second user operation is detected (Step S203—Yes), the terminal control unit 21 performs the execution processing of the game part. Specifically, the terminal control unit 21 reads the game part setting corresponding to mode determined in Step S201 from information relating to the game part stored in the terminal storage unit 18 and executes the game part based on the game part setting.

In the execution processing of the game part of Step S204, in a case where the mode of the game part is the normal mode, as described above, the terminal control unit 21 updates information relating to the user stored in the terminal storage unit 18 and communicates with the server device 11 to update information relating to the user stored in the server device 11. In a case where the mode of the game part is the practice mode, the terminal control unit 21 does not update information relating to the user stored in the terminal storage unit 18 and does not perform communication with the server device 11. For this reason, information relating to the user stored in the server device 11 is not updated.

As described above, the terminal device 12 according to this embodiment determines the mode of the game part to the normal mode or the practice mode if the first user operation to the first interface on the preparation screen is detected and executes the game part in the determined mode. With such a configuration, the user can play the game part in a desired mode of two different modes when playing the game part. For this reason, the convenience of the game is improved compared to a configuration in which the user cannot freely switch between the modes. The terminal device 12 changes a part of the preparation screen according to the mode of the game part. With such a configuration, the user can easily recognize the mode of the game part on the preparation screen, and the convenience of the game is further improved.

Preferably, in the preparation screen, the terminal device 12 may change the display form of the second interface capable of detecting the second user operation for executing the game part in the determined mode according to the mode of the game part. With such a configuration, since the display form of the second interface changes in a manner highly likely to be noticed by the user who is about to start the game part, certainty that the user recognizes the mode of the game part is improved.

In the execution processing of the game part, in a case where the mode of the game part is the normal mode, information relating to the user stored in the server device 11 may be updated. In a case where the mode of the game part is the practice mode, information relating to the user stored in the server device 11 may not be updated. With such a configuration, even if the game part is executed in the practice mode, for example, the stamina, the user experience value, and the like are not changed. For this reason, it is possible to allow the user to practice the game part freely, and the convenience of the game is further improved.

In the execution processing of the game part, in a case where the mode of the game part is the normal mode, the terminal device 12 may communicate with the server device 11. In a case where the mode of the game part is the practice mode, the terminal device 12 may not communicate with the server device 11. In this way, the terminal device 12 can execute the game part in the practice mode on the terminal device 12 alone, and it is possible to suppress a communication frequency and a communication amount.

If the game part is brought into a state of being unable to be continued during the execution of the game part, in a case where the mode of the game part is the normal mode, the terminal device 12 may end the game part automatically or continue the game part according to the user operation. In a case where the mode of the game part is the practice mode, the terminal device 12 may continue the game part automatically. With such a configuration, since it is possible to easily execute CONTINUE in the practice mode compared to the normal mode, the convenience of the game is improved.

Second Embodiment

Next, a game system 10 according to a second embodiment of the invention will be described. In the following description, the same configurations as those in the first embodiment are represented by the same reference numerals, and description thereof will not be repeated. The game system 10 includes a server device 11 and a plurality of terminal devices 12. In summary, the second embodiment is different from the first embodiment in that a game part is used for a competition between users. Hereinafter, specific description will be provided.

In a game according to this embodiment, first, if a first user (a user on offense first) selects a second user among a plurality of users, the second user is determined as a competition opponent (a user on offense last). Subsequently, the user on offense first plays a game part (first game part). In the first game part, the user on offense first performs a competition with an enemy character. Result information of the first game part, for example, may include scores that are determined based on a competition result (for example, win/loss) with the enemy character, the time required until the user on offense first defeats the enemy character, and the like. For example, if the user on offense first defeats the enemy character, scores are high. Similarly, for example, the shorter the time required until the user on offense first defeats the enemy character, the higher the scores.

If the play of the first game part of the user on offense first ends, the user on offense last may play a game part (second game part) corresponding to the first game part. Although the second game part may be, for example, the same game part as the first game part or a game part corresponding to the first game part, other exemplary embodiments may be envisioned in which the second game part may be a game part completely different from the first game part. Similarly to the first game part, in the second game part, the user on offense last performs a competition with the enemy character. Similarly to the first game part, result information of the second game part, for example, scores are determined based on a competition result with the enemy character, the time required until the user on offense last defeats the enemy character, and the like.

If the play of the second game part of the user on offense last ends, the result of an asynchronous competition may be determined based on the result information of the first game part of the user on offense first and the result information of the second game part of the user on offense last. Specifically, a user who has higher scores is defined as a winning user, and a user who has lower scores is defined as a losing user. In this embodiment, the competition between the users is not limited to the above-described asynchronous competition, and may be, for example, a synchronous competition in which the users simultaneously play one game part.

Next, each component of the game system 10 according to this embodiment will be described, primarily focusing on differences from the first embodiment.

Configuration of Server Device 11

First, the server device 11 will be described. The server device 11 may include a server communication unit 13, a server storage unit 14, and a server control unit 15. The server communication unit 13, the server storage unit 14, and the server control unit 15 may be the same as those in the first embodiment (see FIG. 1).

In this embodiment, for example, as shown in FIG. 11, information relating to a user stored in the server storage unit 14 may include login information, a user experience value, a user rank, stamina, information relating to a game content, and a lock flag in association with a user ID. The login information, the user experience value, the user rank, stamina, and information relating to the game content may be the same as those in the first embodiment.

The lock flag may be a flag indicating whether the state of the corresponding user is a lock state or a non-lock state. As described below, if a user on offense first and a user on offense last who perform a competition are determined, the states of the user on offense first and the user on offense last may be brought from the non-lock state into the lock state. If an asynchronous competition ends, the lock states of the user on offense first and the user on offense last may be released and the user on offense first and the user on offense last may be brought into the non-lock state. As described below, a user who is in the lock state may not be able to select a candidate user and start an asynchronous competition and is not selected as a candidate user by other users. That is, in this embodiment, control is performed such that two or more asynchronous competitions are not linked to one user simultaneously. In FIG. 11, a user with the lock flag of "1" indicates a user in the lock state, and a user with the lock flag of "0" indicates a user in the non-lock state.

In this way, since control may be performed such that two or more asynchronous competitions are not linked to one user simultaneously using the lock flag, for example, many asynchronous competitions may be prevented from being linked to a specific user, and delay or obstruction of game progress may be suppressed. For example, the ratio of establishment of an asynchronous competition may be improved compared to a configuration in which many asynchronous competitions are linked to a specific user. Since the number of asynchronous competitions to be processed by the server device 11 in the entire game system 10 is suppressed, a processing load of the server device 11 may be reduced.

In this embodiment, if an acquisition request of information indicating a candidate user is received from the terminal device 12 of the user on offense first as described below, the server control unit 15 may extract, as a candidate user, one or more users in the non-lock state other than the user on offense first among a plurality of users. The server control unit 15 may transmit information indicating one or more extracted candidate users to the terminal device 12 of the user on offense first.

Subsequently, if information indicating one user on offense last selected from among one or more candidate users is received from the terminal device 12 of the user on offense first, the server control unit 15 may define the user on offense first and the user on offense last to the lock state. The server control unit 15 may transmit, to the terminal device 12 of the user on offense last, notification that the user is determined as the user on offense last, that is, a competition opponent in the terminal device 12 of the user on offense first.

Subsequently, if the end of the asynchronous competition of the user on offense first and the user on offense last is detected, the server control unit 15 may determine the result (win/loss) of the asynchronous competition.

For example, if the result information (for example, scores) of the first game part is received from the terminal device 12 of the user on offense first and the result information (for example, scores) of the second game part is received from the terminal device 12 of the user on offense last, the server control unit 15 may detect the end of the asynchronous competition. In such a case, the server control unit 15 may define a user who has higher scores indicated in the result information among the user on offense first and the user on offense last as a winning user and defines a user who has lower scores as a losing user.

For example, in a case where the result information of the game part is not received from at least one of the terminal device 12 of the user on offense first and the terminal device 12 of the user on offense last until a predetermined time elapses after the user on offense first and the user on offense last are defined to the lock state, the server control unit 15 may detect the end of the asynchronous competition. In such a case, the server control unit 15 may define a user regarding the terminal device 12 transmitting the result information as a winning user, and may define a user regarding the terminal device 12 not transmitting the result information as a losing user. Alternatively, in a case where the result of the game part is not received from both of the terminal device 12 of the user on offense first and the terminal device 12 of the user on offense last, the server control unit 15 may determine the result to be a tie.

Configuration of Terminal Device 12

Next, the terminal device 12 will be described. The terminal device 12 may include a terminal communication unit 17, a terminal storage unit 18, a display unit 19, an input unit 20, and a terminal control unit 21. The terminal communication unit 17, the terminal storage unit 18, the display unit 19, the input unit 20, and the terminal control unit 21 may be the same as those in the first embodiment (see FIG. 1).

The terminal control unit 21 may perform different kinds of processing according to whether or not the user is the user on offense last. Hereinafter, specific description will be provided.

Processing in Case of being not User on Offense Last

First, processing which may be performed in a case where the user of the terminal device 12 is not the user on offense last (that is, in a case where the user is not determined as a competition opponent of the terminal device 12 of a different user) will be described. As in the first embodiment, the terminal control unit 21 may display a screen for selecting a game part, a screen for selecting a supporter, and a preparation screen on the display unit 19. The screen for selecting a game part and the screen for selecting a supporter may be the same as those in the first embodiment.

The terminal control unit 21 may change at least a part of the preparation screen according to the mode of the game part.

Figure 12:
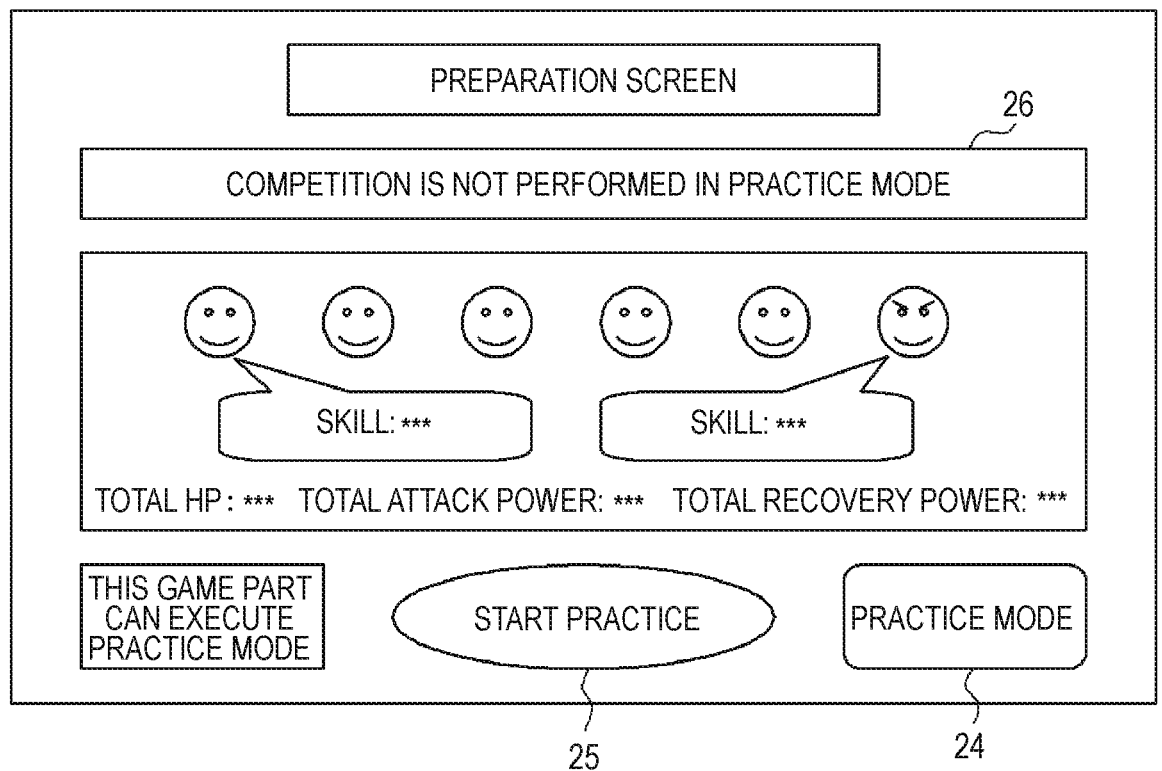
FIG. 12 is a diagram showing a preparation screen in a practice mode according to the second embodiment.

For example, in a case where the mode of the game part is the practice mode, on the preparation screen, a first interface, a second interface, and information relating to the mode of the game part may be displayed. For example, FIG. 12 shows an example of a preparation screen in a case where the mode of the game part is the practice mode. On the preparation screen shown in FIG. 12, text such as "PRACTICE MODE" indicating the mode of the game part may be displayed in a first interface 24. In a second interface 25, text such as "START PRACTICE" may be displayed. The shape of the second interface 25 is an elliptical shape. In an area 26, text such as "COMPETITION IS NOT PERFORMED IN PRACTICE MODE" may be displayed as information relating to the practice mode.

Figure 13:
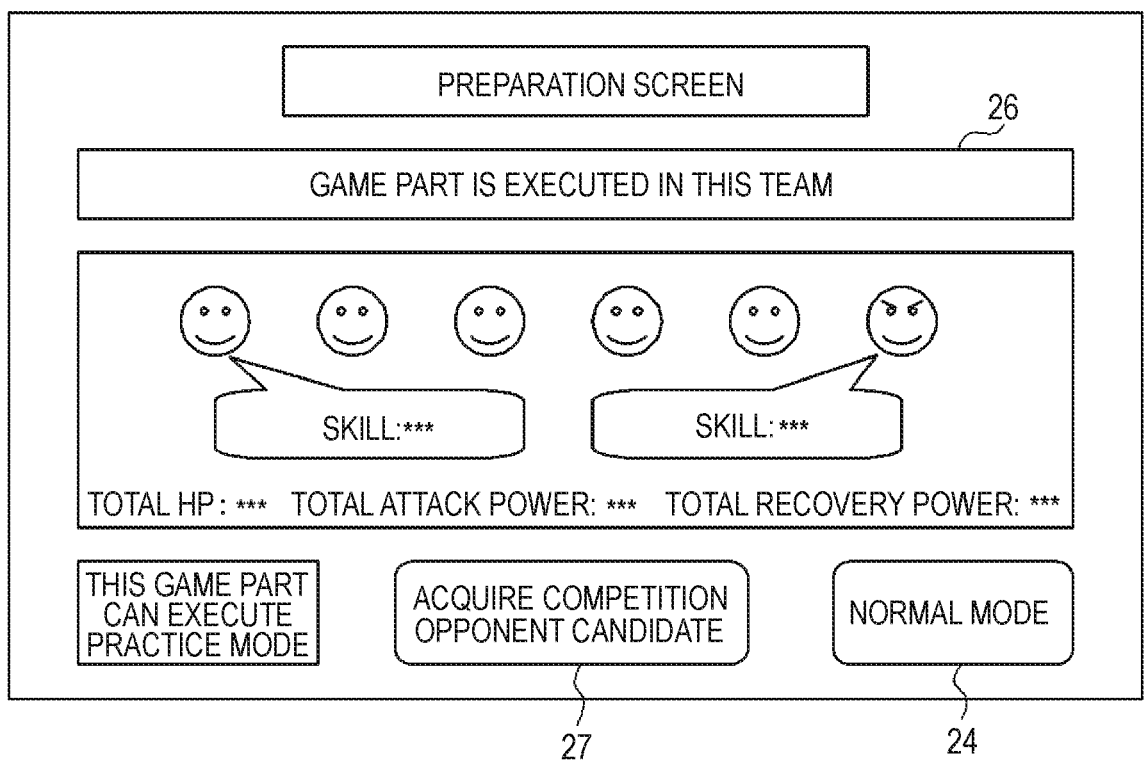
FIG. 13 is a diagram showing a preparation screen in a normal mode according to the second embodiment.

In a case where the mode of the game part is the normal mode, on the preparation screen, a first interface, a third interface, and information relating to the mode of the game part may be displayed. The third interface may be an interface capable of detecting a user operation (third user operation) for acquiring information indicating one or more candidate users of a competition opponent. The third interface may be displayed in place of the above-described second interface. For example, FIG. 13 shows an example of a preparation screen in a case where the mode of the game part is the normal mode. On the preparation screen shown in FIG. 13, text displayed in the first interface 24 may be changed to text such as "NORMAL MODE" indicating the mode of the game part. In a third interface 27 displayed in place of the second interface 25 (see FIG. 12), text such as "ACQUIRE COMPETITION OPPONENT CANDIDATE" may be displayed. The shape of the third interface 27 may be substantially a quadrangular shape. In the area 26, text such as "GAME PART IS EXECUTED IN THIS TEAM" may be displayed as information relating to the normal mode.

If the third user operation to the third interface is detected, the terminal control unit 21 may transmit an acquisition request of information indicating a candidate user to the server device 11. Subsequently, the terminal control unit 21 may acquire information indicating one or more candidate users from the server device 11.

Subsequently, the terminal control unit 21 may display a screen for selecting a competition opponent on the display unit 19 using information indicating one or more candidate users. The screen for selecting a competition opponent may be a screen on which an interface capable of detecting a user operation for selecting one candidate user among one or more candidate users and determining the selected candidate user as a competition opponent (user on offense last) is displayed. If the user operation to the interface is detected, the terminal control unit 21 may determine one candidate user among one or more candidate users as a competition opponent (user on offense last). The terminal control unit 21 may transmit information indicating the determined competition opponent (user on offense last) to the server device 11. On the screen for selecting a competition opponent, a second interface may be displayed. The second interface may be the same as that in the first embodiment.

Figure 14:
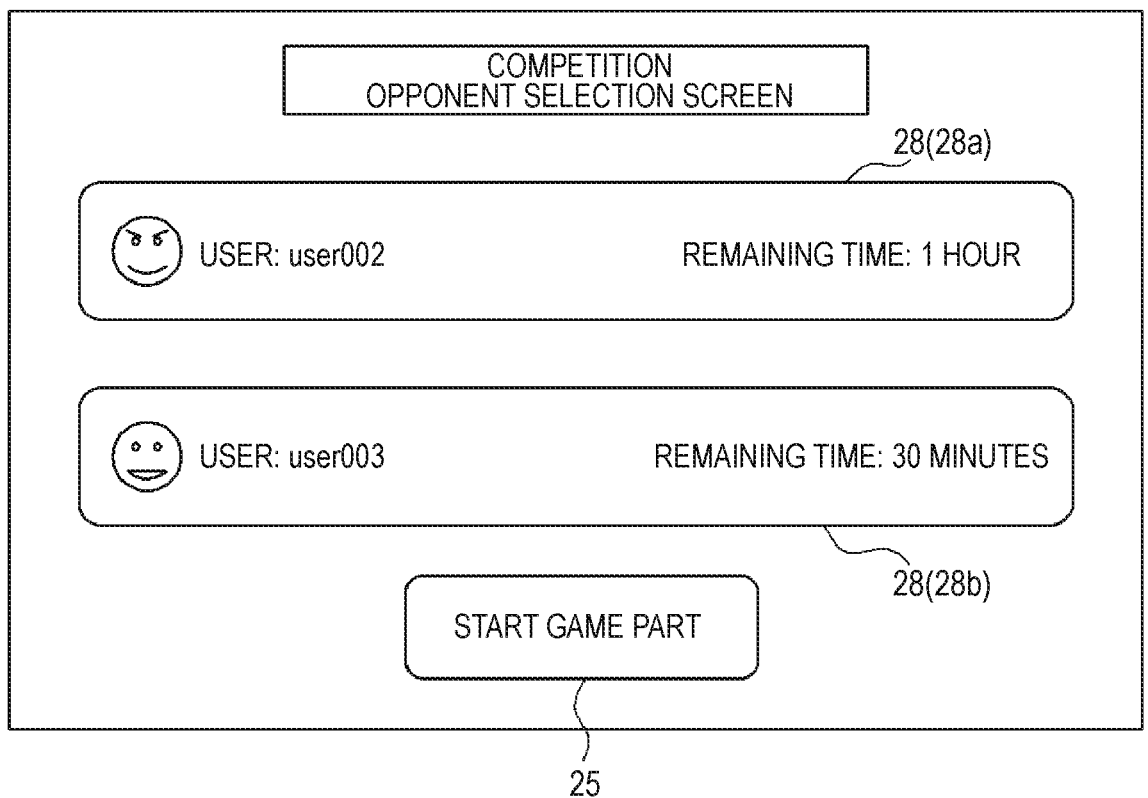
FIG. 14 is a diagram showing a screen for selecting a competition opponent.

For example, on a screen for selecting a competition opponent shown in FIG. 14, two interfaces 28 (28a and 28b) capable of respectively selecting candidate users "user002" and "user003" and the second interface 25 may be displayed. For example, if the user operation to the interface 28a corresponding to the candidate user "user002" is detected, the terminal control unit 21 may determine the candidate user "user002" as a competition opponent (user on offense last). The terminal control unit 21 may transmit information indicating the user on offense last to the server device 11. Subsequently, if the second user operation to the second interface 25 is detected, the terminal control unit 21 may perform the execution processing of the game part in the determined mode of the game part, in this case, the normal mode.

If the game part ends, the terminal control unit 21 may generate the result information (for example, scores) of the game part and may transmit the result information to the server device 11.

Figure 15:
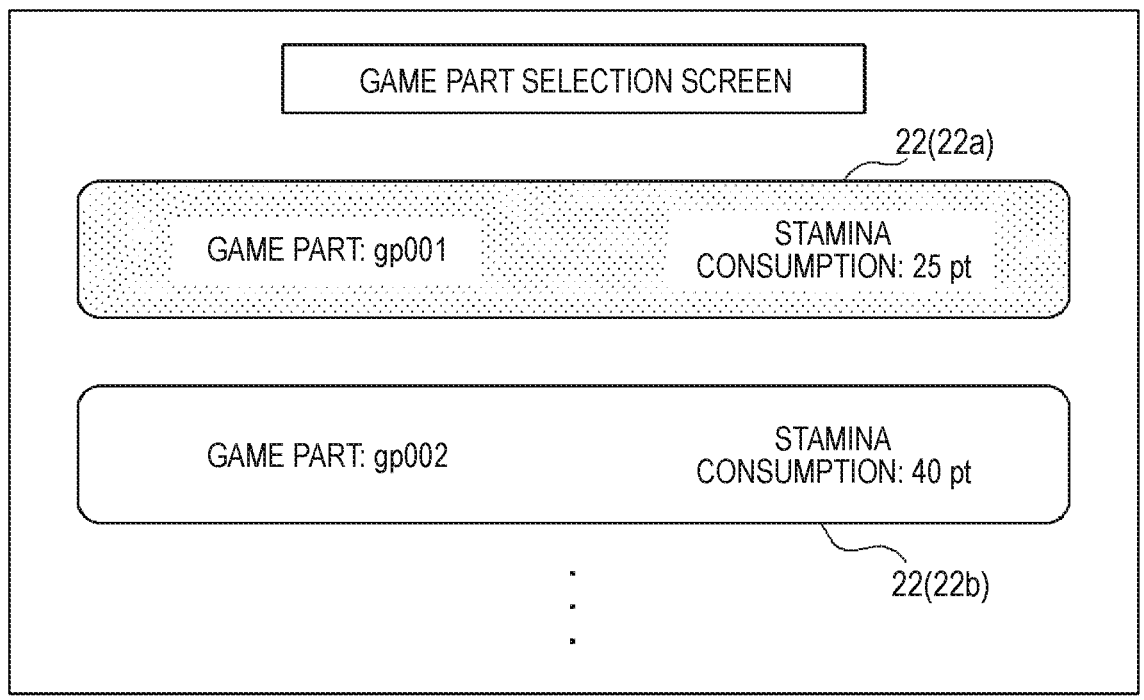
FIG. 15 is a diagram showing a form of a screen for selecting a game part according to the second embodiment.

The terminal control unit 21 may perform control such that the game part is temporarily non-executable until the asynchronous competition ends after the competition opponent (user on offense last) is determined (that is, until the lock states of the user on offense first and the user on offense last are released). Specifically, in a case of displaying a screen for selecting a game part, for example, as shown in FIG. 15, the terminal control unit 21 may display the interface 22a on the screen for selecting a game part in a form (for example, darker than the normal state) different from the normal state. The terminal control unit 21 may inhibit detection of a user operation using the interface 22a. The control for making the game part non-executable is not limited to the above-described processing, and arbitrary processing is employable.

Processing in Case of being User on Offense Last

Next, processing in a case where the user of the terminal device 12 is the user on offense last will be described. If notification that the user of the terminal device is determined as a competition opponent (user on offense last) in the terminal device 12 of a different user (user on offense first) is received from the server device 11, the terminal control unit 21 may determine the different user as the competition opponent (user on offense first).

Similarly to the above-described processing in a case of being the user on offense first, the terminal control unit 21 may display the screen for selecting a game part, the screen for selecting a supporter, and the preparation screen on the display unit 19. The screen for selecting a game part and the screen for selecting a supporter are the same as those in the first embodiment.

The terminal control unit 21 may perform control such that the game part in the practice mode is temporarily non-executable until the asynchronous competition ends after the competition opponent (user on offense first) is determined (that is, until the lock states of the user on offense first and the user on offense last are released). For example, when displaying the preparation screen, even in a case where the practice mode is stored in the terminal storage unit 18 as the mode of the game part, the terminal control unit 21 may display the preparation screen corresponding to the normal mode. The terminal control unit 21 may display the first interface on the preparation screen in a form (for example, darker than the normal state) different from the normal state, for example. The terminal control unit 21 may inhibit detection of the first user operation using the first interface. With such a configuration, only the user on offense last may be prevented from performing the game part in the practice mode after the asynchronous competition starts. Accordingly, fairness between the user on offense first and the user on offense last is improved.

Next, referring generally to the processing relating to the game part which is executed by the terminal device 12 of the user who is not the user on offense last, the processing that may take place before the game part is executed and may begin at a state where the preparation screen is displayed will be described referring to the flowchart of FIG. 16. This processing may be executed after the same processing as Steps S100 to S104 in the first embodiment, for example.

Step S300: First, the terminal control unit 21 determines whether or not the first user operation to the first interface on the preparation screen is detected. In a case where it is determined that the first user operation is detected (Step S300—Yes), the process progresses to Step S301. In a case where it is determined that the first user operation is not detected (Step S300—No), the process progresses to Step S303.

Step S301: In a case where it is determined in Step S300 that the first user operation is detected (Step S300—Yes), the terminal control unit 21 determines the mode of the game part to the normal mode or the practice mode. Specifically, the terminal control unit 21 switches the mode of the game part between the normal mode and the practice mode.

Step S302: Subsequently, the terminal control unit 21 changes at least a part of the preparation screen according to the mode determined in Step S301.

Step S303: After Step S302 or in a case where it is determined in Step S300 that the first user operation is not detected (Step S300—No), the terminal control unit 21 determines whether or not the second user operation to the second interface on the preparation screen is detected. In a case where it is determined that the second user operation is detected (Step S303—Yes), the process progresses to Step S308. In a case where it is determined that the second user operation is not detected (Step S303—No), the process progresses to Step S304.

Step S304: In a case where it is determined in Step S303 that the second user operation is not detected (Step S303—No), the terminal control unit 21 determines whether or not the third user operation to the third interface on the preparation screen is detected. In a case where it is determined that the third user operation is detected (Step S304—Yes), the process progresses to Step S305. In a case where it is determined that the third user operation is not detected (Step S304—No), the process returns to Step S300.

Step S305: In a case where it is determined in Step S304 that the third user operation is detected (Step S304—Yes), the terminal control unit 21 transmits an acquisition request of information indicating a candidate user to the server device 11 and acquires information indicating one or more candidate users from the server device 11.

Step S306: Subsequently, the terminal control unit 21 displays the screen for selecting a competition opponent on the display unit 19 using information indicating one or more candidate users acquired in Step S305.

Step S307: Subsequently, the terminal control unit 21 determines one candidate user among one or more candidate users as a competition opponent (user on offense last) according to a user operation on the screen for selecting a competition opponent. The terminal control unit 21 transmits information indicating the determined competition opponent (user on offense last) to the server device 11.

Step S308: After Step S307 or in a case where it is determined in Step S303 that the second user operation is detected (Step S303—Yes), the terminal control unit 21 performs the execution processing of the game part. Specifically, the terminal control unit 21 reads the game part setting corresponding to the mode determined in Step S301 from information relating to the game part stored in the terminal storage unit 18 and executes the game part based on the game part setting.

In the execution processing of the game part in Step S308, in a case where the mode of the game part is the normal mode, as in the first embodiment, the terminal control unit 21 updates information relating to the user stored in the terminal storage unit 18 and communicates with the server device 11 to update information relating to the user stored in the server device 11. The terminal control unit 21 determines the result information (for example, scores) of the game part and transmits the result information to the server device 11. The transmitted result information is used by the server device 11 in order to determine the competition result of the asynchronous competition.

In a case where the mode of the game part is the practice mode, as in the first embodiment, the terminal control unit 21 may not update information relating to the user stored in the terminal storage unit 18 and may not perform communication with the server device 11. The asynchronous competition with the competition opponent may not be performed.

Although the invention has been described based on the drawings or the examples, it should be noted that various changes and modifications will be apparent to those skilled in the art based on the present disclosure. Therefore, such changes and modifications are to be understood as included within the scope of the invention. For example, the functions and the like included in various means and steps may be reordered in any logically consistent way, and a plurality of means, steps, or the like may be combined into one or divided.

For example, in the above-described embodiment, the terminal control unit 21 may store, in the terminal storage unit 18, first information indicating one or more first game contents included in a game content group used at the time of the execution of the game part in the practice mode. The terminal control unit 21 updates information relating to the user stored in the terminal storage unit 18 such that the first game content included in the game content group becomes one or more first game contents indicated in the first information according to a user operation to select the first information when the game part is executed in the normal mode, for example. With such a configuration, the user can read a game content group used when having played the game part in the practice mode in the past, for example, and the convenience of the game is further improved.

Preferably, the terminal control unit 21 may store the first information in the terminal storage unit 18 in a case where the execution result of the game part in the practice mode satisfies predetermined conditions. For example, the terminal control unit 21 may determine the result information (for example, scores) of the game part in the practice mode and may store the first information in the terminal storage unit 18 in a case where a condition that the scores exceed a predetermined value (for example, the previous maximum scores of the game part in the practice mode) is satisfied. With such a configuration, since the first information is stored only in a case where the execution result of the game part in the practice mode is, for example, satisfactory, the convenience of the game is further improved.

In the game part, predetermined limit conditions relating to a game content group usable for the play of the game part may be set. Although the limit conditions include, for example, a condition that the total value or average value of costs, levels, or the like of all first game contents included in the game content group is less than a predetermined threshold value, the limit conditions may include an arbitrary condition which can be determined based on information relating to the first game content. The terminal control unit 21 determines whether or not the limit conditions of the game part are satisfied based on information relating to the first game content included in the game content group when starting the game part in the normal mode, for example. The terminal control unit 21 may execute the game part in a case where it is determined that the limit conditions are satisfied and may inhibit the execution of the game part in a case where it is determined that the limit conditions are not satisfied.

In such a configuration, the terminal control unit 21 may store, in the terminal storage unit 18, a plurality of kinds of first information when the game part in the practice mode is executed multiple times, for example. The terminal control unit 21 may display a plurality of kinds of first information on the display unit 19 to be selectable respectively when the game part is executed in the normal mode, for example.

The terminal control unit 21 may display, on the display unit 19, only the first information satisfying the limit conditions of the game part among a plurality of kinds of first information. Alternatively, the terminal control unit 21 may perform control such that the first information not satisfying the limit conditions of the game part among a plurality of kinds of first information displayed on the display unit 19 is not selectable. Specifically, the terminal control unit 21 may display the first information not satisfying the limit conditions in a display form (for example, grayout display) different from the normal state and may stop reception of a user operation to select the first information not satisfying the limit conditions. With such a configuration, the user can easily read a game content group satisfying the limit conditions of the game part among a plurality of game content groups used when having played the game part in the practice mode in the past, for example, and the convenience of the game is further improved.

In the above-described embodiment, the terminal control unit 21 may store, in the terminal storage unit 18, second information indicating a second game content used at the time of the execution of the game part in the practice mode. The terminal control unit 21 may give a notification to the user in a case where the second game content indicated in the second information satisfies the selection possibility conditions. With such a configuration, for example, in a case where a second game content used when having played the game part in the practice mode in the past satisfies the selection possibility conditions, since the user can recognize this through a notification, the convenience of the game is further improved.

Preferably, in a case where the second information is stored, the terminal control unit 21 displays the second game content indicated in the second information on the screen for selecting a supporter with priority. With such a configuration, the user can easily find the second game content used in the practice mode in the past on the screen for selecting a supporter, and the convenience of the game is further improved.

Preferably, the terminal control unit 21 may store the second information in the terminal storage unit 18 in a case where the execution result of the game part in the practice mode satisfies predetermined conditions. For example, the terminal control unit 21 may determine the result information (for example, scores) of the game part in the practice mode and may store the second information in the terminal storage unit 18 in a case where a condition that the scores exceed a predetermined value (for example, the previous maximum scores of the game part in the practice mode) is satisfied. With such a configuration, since the second information may be stored only in a case where the execution result of the game part in the practice mode is, for example, satisfactory, the convenience of the game is further improved.

In the above-described embodiment, if the game part is executed using the second game content, in a case where the mode of the game part is the normal mode, the terminal control unit 21 of the terminal device 12 may update information relating to the user stored in the terminal storage unit 18 by adding a user ID of a different user who owns the second game content and information indicating the execution date and time of the game part to information relating to the user stored in the terminal storage unit 18. The terminal control unit 21 may transmit information relating to the user after an update to the server device 11. In this way, information relating to the user stored in the server storage unit 14 of the server device 11 is updated.

When transmitting information relating to at least a part of a plurality of users to the terminal device 12, the server control unit may transmit information relating to other users who satisfy the selection possibility conditions that the elapsed time from the last login date and time indicated in the login information to the current time is less than the predetermined value and the execution date and time of the game part is before the last login date and time among a plurality of users other than the user of the terminal device 12. As described above, the transmitted information relating to other users may be used for the display processing of the screen for selecting a supporter, the execution processing of the game part, and the like in the terminal device 12, for example.

In this way, if the game part in the normal mode is executed using the second game content, the terminal control unit 21 of the terminal device 12 may communicate with the server device 11 to update information relating to the user. Until a different user who owns the second game content logs in again, the selection of the second game content is impossible when starting the game part in the terminal device 12 again. Even if the game part in the practice mode is executed using the second game content, the terminal control unit 21 may not update information relating to the user stored in the terminal storage unit 18 and may not perform communication for updating information relating to the user with the server device 11. For this reason, information relating to the user stored in the server device 11 may not be updated.

In the above-described embodiment, a Web display may function to display a part of various game screens on the terminal device 12 based on data generated by the server device 11, and a native display may function to display a part (for example, a header area and a footer area where menu buttons are provided) of the game screen with a native application installed on the terminal device 12. In this way, the game regarding the above-described embodiment may be a hybrid game in which each of the server device 11 and the terminal device 12 takes charge of a part of processing.

An information processing device, such as a computer or a mobile phone, can be suitably used to function as the server device 11 or the terminal device 12 according to the above-described embodiment. A program containing the processing contents for implementing the functions of the server device 11 or the terminal device 12 according to the embodiment is stored in the storage unit of the information processing device and the functions are implemented by a CPU of the information processing device reading and executing the program.

What is claimed is:

1. A non-transitory computer-readable storage medium comprising program code that, when executed, causes an information processing device of a user to perform steps of:
    storing, in a storing step, on the information processing device, information relating to a game part to be played by the user;
    displaying, in a displaying step, on a display of the information processing device, a screen including a first interface configured to detect a first user operation;
    determining, in a determination step, when the first user operation is detected, a mode of the game part, the mode of the game part consisting of one of a first mode or a second mode;
    changing, in a change step, on the display of the information processing device, a part of the screen according to the mode of the game part, the part of the screen according to the mode of the game part comprising an interface element displaying a game mode and an interface element controlling initiation of the game mode, and maintaining, as a persistent displayed portion, a part of the screen common to the first mode and the second mode, the part of the screen common to the first mode and the second mode comprising a game content group;
    after the change step, transitioning from the screen including the first interface to a screen of an execution step, and executing, in the execution step, the game part in the mode of the game part;
    determining, in a reward determination step, based on the mode of the game part, whether the user is eligible for a reward, wherein the reward determination step comprises: when the mode of the game part is the first game mode, determining that the user is in a reward-eligible mode and evaluating one or more criteria to determine the reward, and when the mode of the game part is the second game mode, determining that the user is not in the reward-eligible mode; and
    when the user is eligible for the reward, storing the reward in association with the user, wherein association between the reward and the user is maintained after a termination of the mode of the game part.

2. The non-transitory computer-readable storage medium according to claim 1, wherein the one or more criteria to determine the reward are one or more predetermined conditions relating to gameplay in the game part.

3. The non-transitory computer-readable storage medium according to claim 2, wherein the one or more predetermined conditions comprises attainment of a game task set for the game part.

4. The non-transitory computer-readable storage medium according to claim 1, wherein determining that the user is in the reward-eligible mode comprises using, as part of the reward determination step, a larger probability that a game content or point value is provided to the user, said larger probability being larger as compared to a probability value applicable when the user is in the second game mode, and wherein evaluating the one or more criteria to determine the reward comprises determining, based on the larger probability, whether the reward is provided.

5. The non-transitory computer-readable storage medium according to claim 4, wherein, when the user is in the reward-eligible mode, the information processing device is configured to execute a step of determining whether to award the game content or point value to the user with a first probability, while when the user is not in the reward-eligible mode, the information processing device is configured to execute a step of determining whether to award the game content or point value to the user with a reduced second probability lower than the first probability.

6. The non-transitory computer-readable storage medium according to claim 1,
    wherein, for the first game mode, the information processing device is configured to perform storing the reward in association with the user by updating information of the user, wherein updating information of the user comprises performing communication between the information processing device and an external system, while for the second game mode, the information processing device is not configured to execute a step of updating information of the user.

7. The non-transitory computer-readable storage medium according to claim 1, wherein the reward is a larger quantity of game content items or points as compared to a quantity of game content items or points eligible to be provided in the second game mode.

8. The non-transitory computer-readable storage medium according to claim 7, wherein, when the user is in the reward-eligible mode, determines whether to award the larger quantity of game content items or points to the user, wherein storing the reward in association with the user comprises awarding the larger quantity of game content items or points to the user and updating a quantity of game content items or points retained by the user, while when the user is not in the reward-eligible mode, the information processing device of the user determines whether to provide the quantity of game content items or points eligible to be provided in the second game mode to the user.

9. The non-transitory computer-readable storage medium according to claim 7, wherein the quantity of game content items or points eligible to be provided in the second game mode is set to zero; and
    wherein, for the first game mode, the information processing device is configured to execute a step of updating information of the user, while for the second game mode, the information processing device is not configured to execute a step of updating information of the user.

10. The non-transitory computer-readable storage medium according to claim 1, wherein executing the first mode is initiated by deducting at least one point from a point supply of the user.

11. The non-transitory computer-readable storage medium according to claim 10, wherein executing the second mode is initiated without deducting the at least one point from the point supply of the user.

12. The non-transitory computer-readable storage medium according to claim 10, wherein executing the second mode is initiated by deducting a smaller amount of points from the point supply of the user than are deducted by executing the first mode.

13. The non-transitory computer-readable medium according to claim 1, wherein, in the execution step:
   in a case where the mode of the game part is the first mode, the information processing device is configured to impose a time limit value and automatically terminate the execution step after the conclusion of the time limit value; and
   in a case where the mode of the game part is the second mode, the information processing device is not configured to impose a time limit value.

14. The non-transitory computer-readable medium according to claim 1, wherein the game content group comprises a leader game content and one or more supporter game contents.

15. The non-transitory computer-readable medium according to claim 14, wherein each of the one or more supporter game contents is associated with another user, and is further associated with a selection possibility condition, said selection possibility condition being a temporary condition based on a gameplay state of the another user.

16. The non-transitory computer-readable medium according to claim 15, wherein the information processing device is further configured to perform a step of:
   displaying, in a displaying step, on a display of the information processing device, a screen including a first interface configured to detect a first user operation, the first interface comprising a selection screen configured to display the at least one supporter game content satisfying the selection possibility condition.

17. The non-transitory computer-readable medium according to claim 15, wherein the information processing device is further configured to perform a step of:
   receiving, from a user operation, a selection of a supporter game content meeting the selection possibility condition, and updating the first interface based on the selection of the supporter game content.

18. The non-transitory computer-readable medium according to claim 14, wherein the execution step comprises executing the game part using the leader game content of the user and the one or more supporter game contents, wherein a leader skill is enabled for the leader game content and disabled for the one or more supporter game contents.

19. An information processing device comprising:
   a storage unit configured to store information relating to a game part to be played by a user;
   a display unit; and
   a control unit,
   wherein the control unit is configured to:
   display, on the display unit of the information processing device, a screen including a first interface configured to detect a first user operation;
   determine, when the first user operation is detected, a mode of the game part, the mode of the game part consisting of one of a first mode or a second mode;
   change, on the display of the information processing device, a part of the screen according to the mode of the game part, the part of the screen according to the mode of the game part comprising an interface element displaying a game mode and an interface element controlling initiation of the game mode, and after said change, transition from the screen including the first interface to a screen of an execution step;
   maintain, as a persistent displayed portion, a part of the screen common to the first mode and the second mode, the part of the screen common to the first mode and the second mode comprising a game content group;
   execute, in the execution step, the game part in the mode of the game part;
   determine, in a reward determination step, based on the mode of the game part, whether the user is eligible for a reward, wherein the reward determination step comprises: when the mode of the game part is the first game mode, determining that the user is in a reward-eligible mode and evaluating one or more criteria to determine the reward, and when the mode of the game part is the second game mode, determining that the user is not in the reward-eligible mode; and
   store, in a condition when the user is eligible for the reward, the reward in association with the user, and maintain the association between the reward and the user after a termination of the mode of the game part.

20. A control method of a game which is configured to be executed by an information processing device of a user, the control method comprising:
   storing, in a storing step, on the information processing device, information relating to a game part to be played by the user;
   displaying, in a displaying step, on a display of the information processing device, a screen including a first interface configured to detect a first user operation;
   determining, in a determination step, when the first user operation is detected, a mode of the game part, the mode of the game part consisting of one of a first mode or a second mode;
   changing, in a change step, on the display of the information processing device, a part of the screen according to the mode of the game part, the part of the screen according to the mode of the game part comprising an interface element displaying a game mode and an interface element controlling initiation of the game mode, and maintaining, as a persistent displayed portion, a part of the screen common to the first mode and the second mode, the part of the screen common to the first mode and the second mode comprising a game content group;
   after the change step, transitioning from the screen including the first interface to a screen of an execution step, and executing, in the execution step, the game part in the mode of the game part;
   determining, in a reward determination step, based on the mode of the game part, whether the user is eligible for a reward, wherein the reward determination step comprises: when the mode of the game part is the first game mode, determining that the user is in a reward-eligible mode and evaluating one or more criteria to determine the reward, and when the mode of the game part is the second game mode, determining that the user is not in the reward-eligible mode and when the user is eligible for the reward, storing the reward in association with the user, wherein association between the reward and the user is maintained after a termination of the mode of the game part.

* * * * *